United States Patent
Bevirt et al.

(10) Patent No.: US 11,827,347 B2
(45) Date of Patent: Nov. 28, 2023

(54) ELECTRIC POWER SYSTEM ARCHITECTURE AND FAULT TOLERANT VTOL AIRCRAFT USING SAME

(71) Applicant: Joby Aero, Inc., Santa Cruz, CA (US)

(72) Inventors: JoeBen Bevirt, Santa Cruz, CA (US); Alex Stoll, Santa Cruz, CA (US); Martin van der Geest, Santa Cruz, CA (US); Scott MacAfee, Santa Cruz, CA (US); Jason Ryan, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 833 days.

(21) Appl. No.: 16/428,794

(22) Filed: May 31, 2019

(65) Prior Publication Data

US 2020/0010187 A1 Jan. 9, 2020

Related U.S. Application Data

(60) Provisional application No. 62/678,275, filed on May 31, 2018.

(51) Int. Cl.
*B64C 29/00* (2006.01)
*B64D 27/24* (2006.01)

(52) U.S. Cl.
CPC .......... *B64C 29/0033* (2013.01); *B64D 27/24* (2013.01); *B64D 2221/00* (2013.01)

(58) Field of Classification Search
CPC ............................ B64C 27/24; B64C 2221/00
USPC ....................................................... 244/53 R
See application file for complete search history.

(56) References Cited

U.S. PATENT DOCUMENTS

| | | | |
|---|---|---|---|
| 1,386,713 A | 8/1921 | Leinweber et al. |
| 1,496,723 A | 6/1924 | Miller |
| 1,634,167 A | 6/1927 | Wilson |
| 1,794,202 A | 2/1931 | Pickard |

(Continued)

FOREIGN PATENT DOCUMENTS

| | | |
|---|---|---|
| CN | 103363993 B | 4/2016 |
| CN | 107042884 A | 8/2017 |

(Continued)

OTHER PUBLICATIONS

NASA, SCEPTOR Critical Design Review, Day 1 Package, Published Nov. 15, 2016, https://www.nasa.gov/aeroresearch/X-57/technical/index.html, pp. 1-242.

(Continued)

*Primary Examiner* — Christopher P Ellis
(74) *Attorney, Agent, or Firm* — SCHWEGMAN LUNDBERG & WOESSNER, P.A.

(57) ABSTRACT

A power system with a reliability enhancing battery architecture for electric motors adapted for use in an aerial vehicle. Individual batteries may be used to power a subset two or more motors in systems with six or more motors, for example. Each motor may be powered may be powered by two or more subsets of batteries, allowing accommodation for motor failure. With a failed motor in a vertical take-off or landing mode, power may be diverted to other motors to continue proper attitude control, and to provide sufficient thrust. With a failed motor a second motor offset from the failed motor may be powered down to facilitate attitude control.

20 Claims, 21 Drawing Sheets

(56) References Cited

U.S. PATENT DOCUMENTS

| | | |
|---|---|---|
| D171,509 S | 2/1954 | Lightbourn et al. |
| 2,868,476 A | 1/1959 | Schlieben |
| 2,969,935 A | 1/1961 | Price |
| 2,981,339 A | 4/1961 | Kaplan |
| 3,002,712 A | 10/1961 | Sterling |
| 3,035,789 A | 5/1962 | Young |
| 3,059,876 A | 10/1962 | Platt |
| 3,081,964 A | 3/1963 | Quenzler |
| 3,082,977 A | 3/1963 | Melvin |
| 3,089,666 A | 5/1963 | Quenzler |
| 3,136,499 A | 6/1964 | Kessler |
| 3,141,633 A | 7/1964 | Mackay |
| 3,159,361 A | 12/1964 | Weiland |
| 3,181,810 A | 5/1965 | Olson |
| 3,231,221 A | 1/1966 | Platt |
| 3,259,343 A | 7/1966 | Roppel |
| 3,350,035 A | 10/1967 | Schlieben |
| 3,360,217 A | 12/1967 | Trotter |
| 3,404,852 A | 10/1968 | Sambell et al. |
| 3,592,412 A | 7/1971 | Glatfelter |
| 3,618,875 A | 11/1971 | Kappus |
| 3,693,910 A | 9/1972 | Aldi |
| 3,795,372 A | 3/1974 | Feldman |
| 3,834,654 A | 9/1974 | Miranda |
| 3,856,238 A | 12/1974 | Malvestuto |
| 4,022,405 A | 5/1977 | Peterson |
| 4,047,840 A | 9/1977 | Ravenhall et al. |
| 4,053,125 A | 10/1977 | Ratony |
| 4,146,199 A | 3/1979 | Wenzel |
| 4,356,546 A | 10/1982 | Whiteside et al. |
| 4,387,866 A | 6/1983 | Eickmann |
| 4,434,389 A | 2/1984 | Langley et al. |
| 4,519,746 A | 5/1985 | Wainauski et al. |
| 4,784,351 A | 11/1988 | Eickmann |
| 4,799,629 A | 1/1989 | Mori |
| 4,914,657 A | 4/1990 | Walter et al. |
| 4,925,131 A | 5/1990 | Eickmann |
| 4,979,698 A | 12/1990 | Lederman |
| 4,982,914 A | 1/1991 | Eickmann |
| 5,031,858 A | 7/1991 | Schellhase et al. |
| 5,082,079 A | 1/1992 | Lissaman et al. |
| 5,085,315 A | 2/1992 | Sambell |
| 5,141,176 A | 8/1992 | Kress et al. |
| 5,184,304 A | 2/1993 | Huddle |
| 5,374,010 A | 12/1994 | Stone et al. |
| 5,405,105 A | 4/1995 | Kress |
| 5,419,514 A | 5/1995 | Duncan |
| 5,515,282 A | 5/1996 | Jackson |
| 5,715,162 A | 2/1998 | Daigle |
| 5,806,805 A | 9/1998 | Elbert et al. |
| 5,823,468 A | 10/1998 | Bothe |
| 5,839,691 A | 11/1998 | Lariviere |
| 5,842,667 A | 12/1998 | Jones |
| 5,868,351 A | 2/1999 | Stamps et al. |
| 6,098,923 A | 8/2000 | Peters |
| 6,254,032 B1 | 7/2001 | Bucher |
| 6,260,796 B1 | 7/2001 | Klingensmith |
| 6,276,633 B1 | 8/2001 | Balayn et al. |
| 6,286,783 B1 | 9/2001 | Kuenkler |
| 6,293,491 B1 | 9/2001 | Wobben |
| 6,343,127 B1 | 1/2002 | Billoud |
| 6,402,088 B1 | 6/2002 | Syrovy et al. |
| 6,474,604 B1 | 11/2002 | Carlow |
| 6,561,455 B2 | 5/2003 | Capanna |
| 6,625,033 B1 | 9/2003 | Steinman |
| 6,655,631 B2 | 12/2003 | Austen-Brown |
| 6,719,244 B1 | 4/2004 | Gress |
| 6,745,977 B1 | 6/2004 | Long et al. |
| 6,883,748 B2 | 4/2005 | Yoeli |
| 6,892,980 B2 | 5/2005 | Kawai |
| 7,048,505 B2 | 5/2006 | Segota et al. |
| 7,118,066 B2 | 10/2006 | Allen |
| 7,147,182 B1 | 12/2006 | Flanigan |
| 7,159,817 B2 | 1/2007 | Vandermey et al. |
| 7,193,391 B2 | 3/2007 | Moore |
| 7,219,013 B1 | 5/2007 | Young et al. |
| 7,263,630 B2 | 8/2007 | Sailer |
| 7,310,573 B2 | 12/2007 | Stickling |
| 7,318,565 B2 | 1/2008 | Page |
| 7,376,088 B2 | 5/2008 | Gambardella et al. |
| 7,802,754 B2 | 9/2010 | Karem |
| 7,822,516 B2 | 10/2010 | Yanaka et al. |
| 7,857,253 B2 | 12/2010 | Yoeli |
| 7,857,254 B2 | 12/2010 | Parks |
| 7,874,513 B1 | 1/2011 | Smith |
| 8,016,226 B1 | 9/2011 | Wood |
| 8,056,866 B2 | 11/2011 | De |
| 8,152,096 B2 | 4/2012 | Smith |
| 8,275,494 B1 | 9/2012 | Roth |
| 8,376,264 B1 | 2/2013 | Hong et al. |
| 8,469,306 B2 | 6/2013 | Kuhn |
| 8,485,464 B2 | 7/2013 | Kroo |
| 8,527,233 B2 | 9/2013 | Mcintyre |
| 8,602,347 B2 | 12/2013 | Isaac et al. |
| 8,708,273 B2 | 4/2014 | Oliver |
| 8,733,690 B2 | 5/2014 | Bevirt et al. |
| 8,800,912 B2 | 8/2014 | Oliver |
| 8,849,479 B2 | 9/2014 | Walter |
| 8,998,125 B2 | 4/2015 | Hollimon et al. |
| 9,102,401 B2 | 8/2015 | Collins et al. |
| 9,128,109 B1 | 9/2015 | Oneill |
| 9,415,870 B1 | 8/2016 | Beckman et al. |
| 9,435,661 B2 | 9/2016 | Brenner et al. |
| 9,694,911 B2 | 7/2017 | Bevirt et al. |
| 9,786,961 B2 | 10/2017 | Dyer et al. |
| 9,944,386 B1 | 4/2018 | Reichert et al. |
| 9,963,228 B2 | 5/2018 | Mccullough et al. |
| 10,046,855 B2 | 8/2018 | Bevirt et al. |
| 10,144,503 B1 | 12/2018 | Vander Lind et al. |
| 10,183,746 B2 | 1/2019 | Mccullough et al. |
| 10,246,184 B2 | 4/2019 | Ragland |
| 10,287,011 B2 | 5/2019 | Wolff et al. |
| 10,364,036 B2 | 7/2019 | Tighe et al. |
| 10,497,996 B1 | 12/2019 | Muniz et al. |
| 10,513,334 B2 | 12/2019 | Groninga et al. |
| 11,065,979 B1 * | 7/2021 | Demont ............... H01M 10/482 |
| 2003/0038213 A1 | 2/2003 | Yoeli |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0094537 A1 | 5/2003 | Austen-Brown |
| 2003/0106959 A1 | 6/2003 | Fukuyama |
| 2004/0126241 A1 | 7/2004 | Zha et al. |
| 2004/0195460 A1 | 10/2004 | Sailer |
| 2004/0245376 A1 | 12/2004 | Muren |
| 2005/0178879 A1 | 8/2005 | Mao |
| 2005/0230524 A1 | 10/2005 | Ishiba |
| 2006/0016930 A1 | 1/2006 | Pak |
| 2006/0097103 A1 | 5/2006 | Atmur |
| 2006/0113426 A1 | 6/2006 | Yoeli |
| 2006/0226281 A1 | 10/2006 | Walton |
| 2007/0221779 A1 | 9/2007 | Ikeda |
| 2008/0048065 A1 | 2/2008 | Kuntz |
| 2008/0205416 A1 | 8/2008 | Dechiara |
| 2008/0283673 A1 | 11/2008 | Yoeli |
| 2009/0008499 A1 | 1/2009 | Shaw |
| 2009/0084907 A1 | 4/2009 | Yoeli |
| 2009/0140102 A1 | 6/2009 | Yoeli |
| 2009/0159757 A1 | 6/2009 | Yoeli |
| 2009/0200431 A1 | 8/2009 | Konings et al. |
| 2009/0224095 A1 | 9/2009 | Cox et al. |
| 2009/0283629 A1 | 11/2009 | Kroetsch et al. |
| 2010/0072325 A1 | 3/2010 | Sambell |
| 2010/0076625 A1 | 3/2010 | Yoeli |
| 2010/0100260 A1 | 4/2010 | Mcintyre et al. |
| 2010/0193644 A1 | 8/2010 | Karem |
| 2010/0264257 A1 | 10/2010 | Brunken |
| 2010/0270419 A1 | 10/2010 | Yoeli |
| 2010/0270435 A1 | 10/2010 | Karem |
| 2011/0001020 A1 | 1/2011 | Forgac |
| 2011/0042508 A1 | 2/2011 | Bevirt |
| 2011/0042509 A1 | 2/2011 | Bevirt et al. |
| 2011/0042510 A1 * | 2/2011 | Bevirt ................. B64C 29/0033 244/12.4 |

(56) References Cited

U.S. PATENT DOCUMENTS

| | | |
|---|---|---|
| 2011/0049306 A1 | 3/2011 | Yoeli |
| 2011/0049307 A1 | 3/2011 | Yoeli |
| 2011/0139923 A1 | 6/2011 | Papanikolopoulos et al. |
| 2011/0139939 A1 | 6/2011 | Martin et al. |
| 2011/0147533 A1 | 6/2011 | Goossen et al. |
| 2011/0315809 A1 | 12/2011 | Oliver |
| 2012/0025016 A1 | 2/2012 | Methven et al. |
| 2012/0061526 A1 | 3/2012 | Brunken |
| 2012/0091257 A1 | 4/2012 | Wolff et al. |
| 2012/0234968 A1 | 9/2012 | Smith |
| 2013/0132548 A1 | 5/2013 | Cabos |
| 2013/0201316 A1 | 8/2013 | Binder et al. |
| 2013/0204544 A1 | 8/2013 | Thomas |
| 2014/0299708 A1 | 10/2014 | Green et al. |
| 2014/0333127 A1* | 11/2014 | Edwards ............... H02J 4/00 307/9.1 |
| 2014/0358333 A1 | 12/2014 | White et al. |
| 2015/0012154 A1* | 1/2015 | Senkel ............ B64C 27/473 701/4 |
| 2015/0056058 A1 | 2/2015 | Grissom et al. |
| 2015/0102659 A1 | 4/2015 | Liffring et al. |
| 2015/0136897 A1 | 5/2015 | Seibel et al. |
| 2015/0147181 A1 | 5/2015 | Henze et al. |
| 2015/0232178 A1 | 8/2015 | Reiter |
| 2015/0266571 A1 | 9/2015 | Bevirt et al. |
| 2015/0360794 A1 | 12/2015 | Certain et al. |
| 2016/0031555 A1 | 2/2016 | Bevirt et al. |
| 2016/0031556 A1 | 2/2016 | Bevirt et al. |
| 2016/0083073 A1 | 3/2016 | Beckman |
| 2016/0094143 A1* | 3/2016 | Huang ............... H02J 9/061 336/170 |
| 2016/0112151 A1 | 4/2016 | Chedas et al. |
| 2016/0144957 A1 | 5/2016 | Claridge et al. |
| 2016/0236790 A1* | 8/2016 | Knapp ............... G01C 21/20 |
| 2016/0272312 A1 | 9/2016 | Mallard |
| 2016/0294882 A1 | 10/2016 | Michaels |
| 2016/0304194 A1 | 10/2016 | Bevirt et al. |
| 2016/0304214 A1 | 10/2016 | Himmelmann et al. |
| 2016/0340051 A1* | 11/2016 | Edwards ............... B64D 35/02 |
| 2017/0057650 A1 | 3/2017 | Walter-Robinson |
| 2017/0066531 A1 | 3/2017 | Mcadoo |
| 2017/0101176 A1 | 4/2017 | Alber et al. |
| 2017/0104385 A1 | 4/2017 | Salamon et al. |
| 2017/0253344 A1* | 9/2017 | Wangemann ............ B60L 50/15 |
| 2017/0274983 A1 | 9/2017 | Beckman et al. |
| 2017/0277152 A1 | 9/2017 | Liu et al. |
| 2017/0297431 A1 | 10/2017 | Epstein et al. |
| 2017/0331323 A1 | 11/2017 | Ehrmantraut |
| 2018/0002016 A1 | 1/2018 | Mccullough et al. |
| 2018/0105279 A1 | 4/2018 | Tighe et al. |
| 2018/0118356 A1* | 5/2018 | Armstrong ............ B64C 11/30 |
| 2018/0141428 A1 | 5/2018 | Toyota et al. |
| 2018/0237148 A1 | 8/2018 | Hehn et al. |
| 2018/0244370 A1 | 8/2018 | Lombard |
| 2018/0251226 A1 | 9/2018 | Fenny et al. |
| 2018/0290736 A1 | 10/2018 | Mikic et al. |
| 2018/0319491 A1 | 11/2018 | Kearney-Fischer |
| 2018/0354615 A1 | 12/2018 | Groninga et al. |
| 2018/0356439 A1 | 12/2018 | Luo et al. |
| 2019/0013679 A1* | 1/2019 | Radun .............. H02J 3/36 |
| 2019/0044451 A1* | 2/2019 | Huang ............... H02P 27/06 |
| 2019/0210740 A1 | 7/2019 | Luo |
| 2019/0214161 A1 | 7/2019 | Chen et al. |
| 2019/0288533 A1* | 9/2019 | Stroppiana ............ B64C 39/024 |
| 2019/0393809 A1* | 12/2019 | Lacaux ............... B64D 33/00 |
| 2020/0290742 A1* | 9/2020 | Kumar ............... B64D 27/24 |
| 2021/0309392 A1* | 10/2021 | Wiegman ............ B64F 5/60 |
| 2021/0339881 A1* | 11/2021 | Bevirt ............... B60L 58/18 |
| 2022/0009643 A1* | 1/2022 | Datta ............... B60L 3/0092 |

FOREIGN PATENT DOCUMENTS

| | | | |
|---|---|---|---|
| CN | 112368208 | 2/2021 | |
| DE | 102012104783 A1 | 12/2013 | |
| EP | 0945841 A1 | 9/1999 | |
| EP | 3090951 | 11/2016 | |
| EP | 3184425 | 6/2017 | |
| EP | 3366583 A1 | 8/2018 | |
| EP | 3802322 | 4/2021 | |
| GB | 1271102 A | 4/1972 | |
| JP | 2017527059 | 9/2017 | |
| JP | 2017184504 | 10/2017 | |
| JP | 2021525673 | 9/2021 | |
| KR | 20210006972 | 1/2021 | |
| RU | 2724940 C2 * | 6/2020 | ............ B64C 27/28 |
| WO | 03074924 A1 | 9/2003 | |
| WO | 03086857 A1 | 10/2003 | |
| WO | 2017009037 A1 | 1/2017 | |
| WO | 2017108634 A1 | 6/2017 | |
| WO | 2017200609 | 11/2017 | |
| WO | 2018084261 | 5/2018 | |
| WO | 2019001203 A1 | 1/2019 | |
| WO | 2019056053 A1 | 3/2019 | |
| WO | 2019232472 | 12/2019 | |
| WO | 2022115132 | 6/2022 | |

OTHER PUBLICATIONS

Arthur Dubois, Martin van der Geest, JoeBen Bevirt, Sean Clarke, Robert J. Christie, Nicholas K. Borer, Design of an Electric Propulsion System for SCEPTOR, Published Jun. 13, 2016, Aviation Technology, Integration, and Operations Conference, Washington, DC, pp. 1-30.

European Search Report for Application No. 15765064.9 dated Oct. 16, 2017.

International Search Report and Written Opinion for Application No. PCT/US10/46500 dated Apr. 13, 2011.

International Search Report and Written Opinion for Application No. PCT/US15/21344 dated Sep. 11, 2015.

International Search Report and Written Opinion for Application No. PCT/US15/21350 dated Sep. 15, 2015.

International Search Report and Written Opinion for Application No. PCT/US2017/059809 dated Jul. 31, 2018.

"Airfolds Blade Profile", Mecaflux Heliciel, Propeller & Wing, https://www.heliciel.com/en/aerodynamique-hydrodynamique/profils%20aile%20profil%20pale.htm.

"Curtiss-Wright X-19", Wikipedia, https://en.wikipedia.org/wiki/Curtiss-Wright_X-19.

"Inclined Flat Plate", Aerodynamics of the airplane, Feb. 13, 2016.

International Search Report and Written Opinion for PCT Application No. PCT/US2019/039247 dated Sep. 13, 2019.

International Search Report and Written Opinion for PCT Application No. PCT/US2019035236 dated Aug. 20, 2019.

International Search Report and Written Opinion of the ISA dated Dec. 4, 2019 for PCT/US19/51565.

International Search Report and Written Opinion of the ISA, dated Jul. 24, 2019, for application No. PCT/US19/31863.

Carson, Biz , "First Look: Uber Unveils New Design for Uber Eats Delivery Drone", https:www.forbes.com/sites/bizcarson/2019/10/28/first-look-uber-unveils-new-design-for-uber-eats-delivery-drone/#1703f8d778f2.

Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.

Falco, Gianluca , et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/.

Gold, Phillip J., et al., "Design and Pilot Evaluation of the RAH-66 Comanche Selectable Control Modes", https://ntrs nasa.gov/search.jsp?, N94-13322, pp. 419-431, Jul. 1, 1993.

Kim, Tae , "Reduction of Tonal Propeller Noise by Means of Uneven Blade Spacing", University of California, Irvine, Thesis, publication date 2016.

Saraf, A. Amit Kumar , et al., "Study of Flow Separation on Airfoil with Bump", International Journal of Applied Engineering Research ISSN 09773-4562, vol. 13, No. 16 (2018), pp. 128686-12872.

(56) References Cited

OTHER PUBLICATIONS

Sullivan, Brenda M., et al., "A Subject Test of Modulated Blade Spacing for Helicopter Main Rotors", Presented at the American Helicopter Society 58th Annual Forum, Montreal, Canada, Jun. 11-13, 2002, http://ntrs.nasa.gov/search.sp.
Yeh, Y.C. (Bob), "Triple-Triple Redundant 777 Primary Flight Computer", 1996, IEEE, pp. 293-307 (Year: 1996).
Young, Larry A., "Conceptual Design Aspects of Three General Sub-Classes of Multi-Rotor Configurations: Distributed, Modular, and Hetergenerous", NASA Ames Research Center, Moffett Field, CA 94035, Published 2015, Computer Science.
"International Application Serial No. PCT US2019 035044, International Search Report dated Sep. 20, 2019", 2 pgs.
"International Application Serial No. PCT US2019 035044, Written Opinion dated Sep. 20, 2019", 6 pgs.
"International Application Serial No. PCT US2019 035044, International Preliminary Report on Patentability dated Dec. 10, 2020", 8 pgs.
"European Application Serial No. 19812608.8, Response to Communication pursuant to Rules 161(1) and 162 EPC filed Feb. 24, 2021", 10 pgs.
"European Application Serial No. 19812608.8, Extended European Search Report dated Jan. 21, 2022", 7 pgs.
"Japanese Application Serial No. 2020-566669, Notification of Reasons for Refusal dated Feb. 22, 2022", w English Translation, 9 pgs.
"International Application Serial No. PCT US2021 042205, International Search Report dated Mar. 21, 2022", 6 pgs.
"International Application Serial No. PCT US2021 042205, Written Opinion dated Mar. 21, 2022", 6 pgs.
"Korean Application Serial No. 10-2020-7035350, Notice of Preliminary Rejection dated Mar. 27, 2022", w English translation, 8 pgs.
"European Application Serial No. 19812608.8, Response Filed Jul. 28, 2022 to Extended European Search Report dated Jan. 21, 2022", 7 pgs.
"Japanese Application Serial No. 2020-566669, Notification of Reasons for Refusal dated Sep. 27, 2022", w English Translation, 11 pgs.
"Korean Application Serial No. 10-2020-7035350, Notice of Preliminary Rejection dated Oct. 27, 2022", With English translation, 9 pgs.
"Japanese Application Serial No. 2020-566669, Response Filed Dec. 23, 2022 to Notification of Reasons for Refusal dated Sep. 27, 2022", W English Claims, 10 pgs.
"Korean Application Serial No. 10-2020-7035350, Response Filed Dec. 26, 2022 to Notice of Preliminary Rejection dated Oct. 27, 2022", W English Claims, 17 pgs.
"Japanese Application Serial No. 2020-566669, Response Filed May 20, 2022 to Notification of Reasons for Refusal dated Feb. 22, 2022", W English Claims, 12 pgs.
"Korean Application Serial No. 10-2020-7035350, Response Filed May 25, 2022 to Notice of Preliminary Rejection dated Mar. 27, 2022", With English machine translation, 29 pgs.
"European Application Serial No. 19812608.8, Communication pursuant to Rule 114(2) EPC dated Feb. 17, 2023", 6 pgs.
"Japanese Application Serial No. 2020-566669, Examiners Decision of Final Refusal dated Mar. 7, 2023", w English Translation, 8 pgs.
"Korean Application Serial No. 10-2020-7035350, Final Office Action dated Apr. 25, 2023", w English Translation, 6 pgs.
"International Application Serial No. PCT US2021 042205, International Preliminary Report on Patentability dated Jun. 8, 2023", 8 pgs.
"European Application Serial No. 19812608.8, Communication Pursuant to Article 94(3) EPC dated Jun. 28, 2023", 4 pgs.

* cited by examiner

ELECTRIC POWER SYSTEM ARCHITECTURE AND FAULT TOLERANT VTOL AIRCRAFT USING SAME

CROSS-REFERENCE TO RELATED APPLICATIONS

This application claims priority to U.S. Provisional Patent Application No. 62/678,275 to Bevirt et al., filed May 31, 2018, which is hereby incorporated by reference in its entirety.

FIELD OF THE INVENTION

This invention relates to electric powered flight, namely a power system for electric motors used on aerial vehicles.

SUMMARY

Figure 1A:
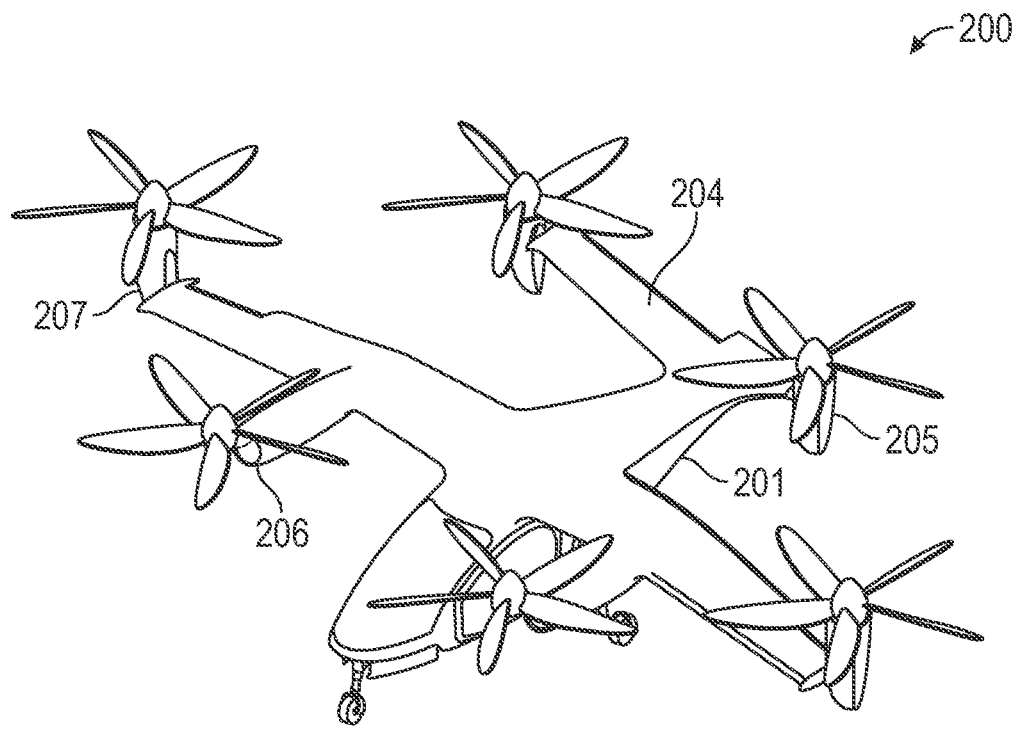
FIGS. 1A-1D are of a VTOL aircraft in a hover configuration according to some embodiments of the present invention.
Figure 1B:
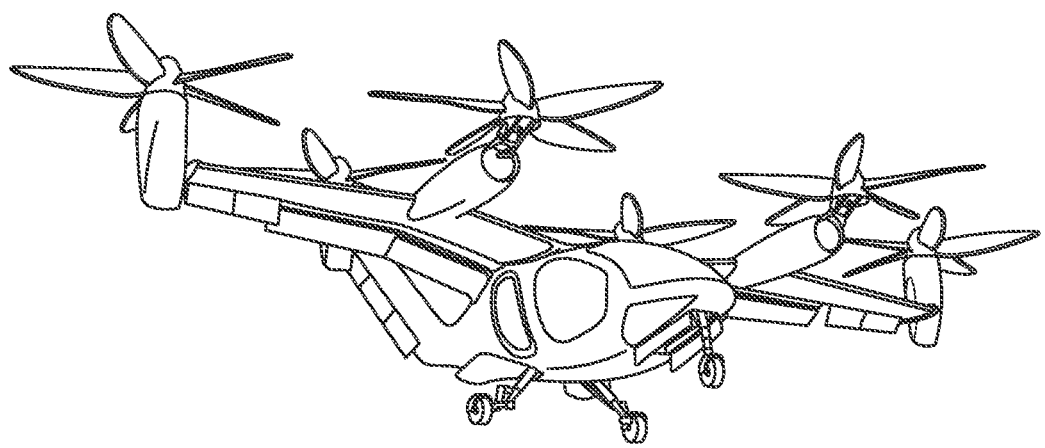
Figure 1C:
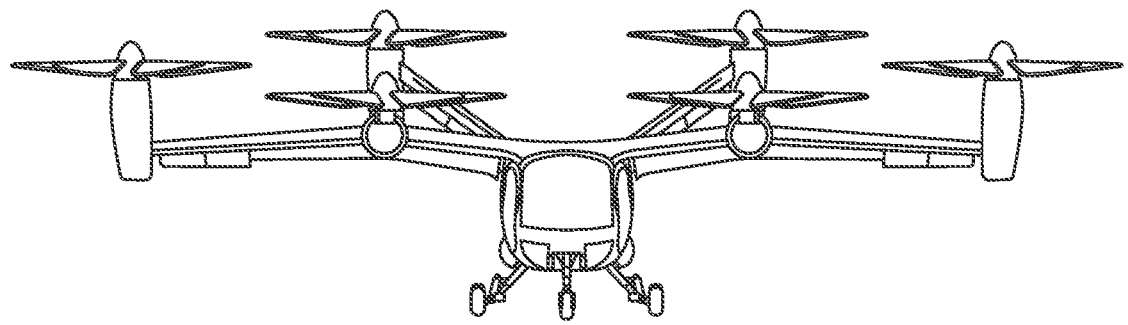

A power system with a reliability enhancing power system architecture for electric motors adapted for use in an aerial vehicle. Individual batteries may be used to power a subset of two or more motors in systems with six or more motors, for example. Each motor may be powered by two or more subsets of batteries, allowing accommodation for motor failure. Each motor may have two or more sets of windings, with each winding powered by a different battery. With a failed winding, failed battery, or failed motor in a forward flight or a vertical take-off and landing mode, power routing may be automatically altered to continue proper attitude control, and to provide sufficient thrust. With a failed motor a second motor offset from the failed motor may be powered down to facilitate attitude control.

DETAILED DESCRIPTION

In some aspects, an aerial vehicle may use bladed propellers powered by electric motors to provide thrust during take-off. The propeller/motor units may be referred to as propulsion assemblies. In some aspects, the wings of the aerial vehicle may rotate, with the leading edges facing upwards, such that the propellers provide vertical thrust for take-off and landing. In some aspects, the motor driven propeller units on the wings may themselves rotate relative to a fixed wing, such that the propellers provide vertical thrust for take-off and landing. The rotation of the motor driven propeller units may allow for directional change of thrust by rotating both the propeller and the electric motor, thus not requiring any gimbaling, or other method, of torque drive around or through a rotating joint.

In some aspects, aerial vehicles according to embodiments of the present invention take off from the ground with vertical thrust from rotor assemblies that have deployed into a vertical configuration. As the aerial vehicle begins to gain altitude, the rotor assemblies may begin to be tilted forward in order to begin forward acceleration. As the aerial vehicle gains forward speed, airflow over the wings results in lift, such that the rotors become less important and then unnecessary for maintaining altitude using vertical thrust. Once the aerial vehicle has reached sufficient forward speed, some or all of the blades used for providing vertical thrust during take-off may be stowed along their nacelles. In some aspects, all propulsion assemblies used for vertical take-off and landing are also used during forward flight. The nacelle supporting the propulsion assemblies may have recesses such that the blades may nest into the recesses, greatly reducing the drag of the disengaged rotor assemblies.

After take-off, the aerial vehicle will begin a transition to forward flight by articulating the propellers from a vertical thrust orientation to a position which includes a horizontal thrust element. As the aerial vehicle begins to move forward with speed, lift will be generated by the wings, thus requiring less vertical thrust form the rotors. As the propellers are articulated further towards the forward flight, horizontal thrust, configuration, the aerial vehicle gains more speed.

In a first vertical configuration according to some embodiments of the present invention, as seen in a vertical take-off configuration in FIGS. 1A through 1D, an aerial vehicle 200 uses fixed wings 202, 203, which may be forward swept wings, with propulsion assemblies of the same or different types adapted for both vertical take-off and landing and for forward flight. In this configuration, the propulsion assemblies are positioned for vertical thrusting. The aircraft body 201 supports a left wing 202 and a right wing 203. Motor driven propulsion assemblies 206 along the wings may include electric motors and propellers which are adapted to articulate from a forward flight configuration to a vertical configuration using deployment mechanisms which may reside in the nacelle body, and which deploy the motor and propeller while all or most of the nacelle remains in place attached to the wing. In some aspects, the propeller blades may stow and nest into the nacelle body. The motor driven rotor assemblies 207 at the wing tips may deploy from a forward flight configuration to a vertical take-off and landing configuration along a pivot axis wherein the nacelle and the electric motor and propeller deploy in unison. Although illustrated with one mid-span propulsion assembly and one wingtip propulsion assembly per wing, in some aspects more mid-span propulsion assemblies may be present.

The aircraft body 201 extends rearward is also attached to raised rear stabilizers 204. The rear stabilizers have rear propulsion assemblies 205 attached thereto. The motor driven rotor assemblies 205 at the tips of the rear stabilizers may deploy from a forward flight configuration to a vertical take-off and landing configuration along a pivot axis wherein the nacelle and the electric motor and propeller deploy in unison.

Figure 1D:
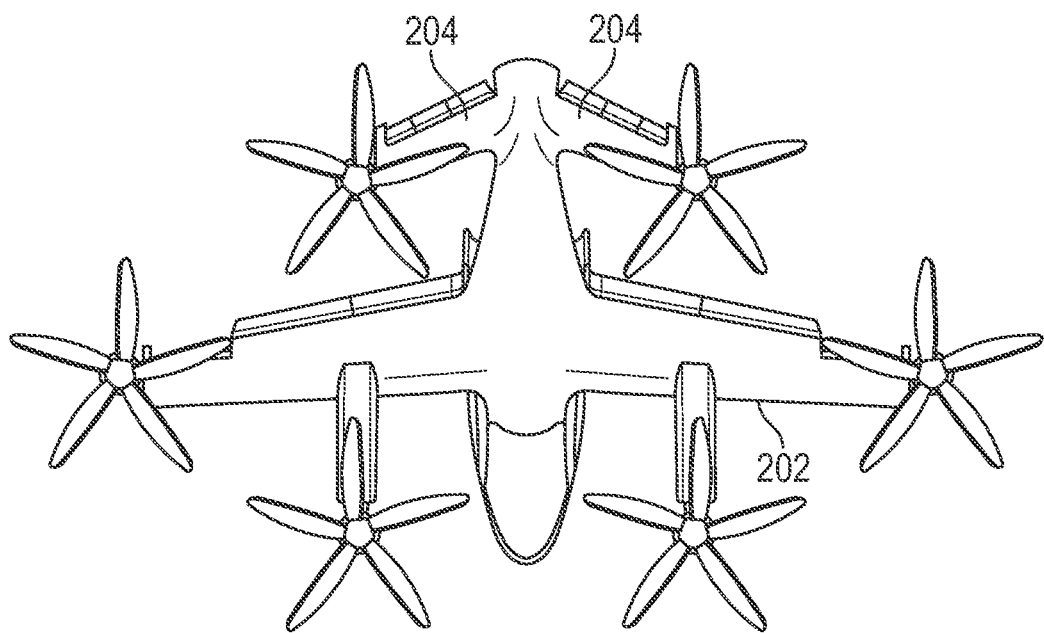
Figure 1E:
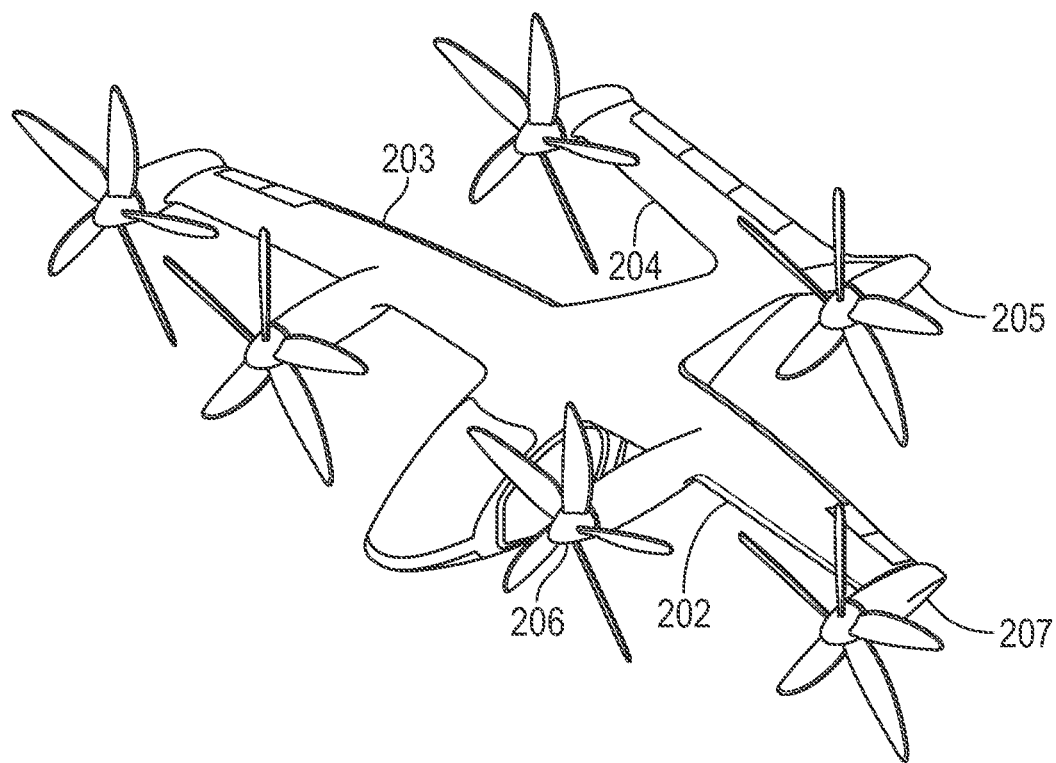
FIGS. 1E-1H are of a VTOL aircraft in a forward flight configuration according to some embodiments of the present invention.
Figure 1F:
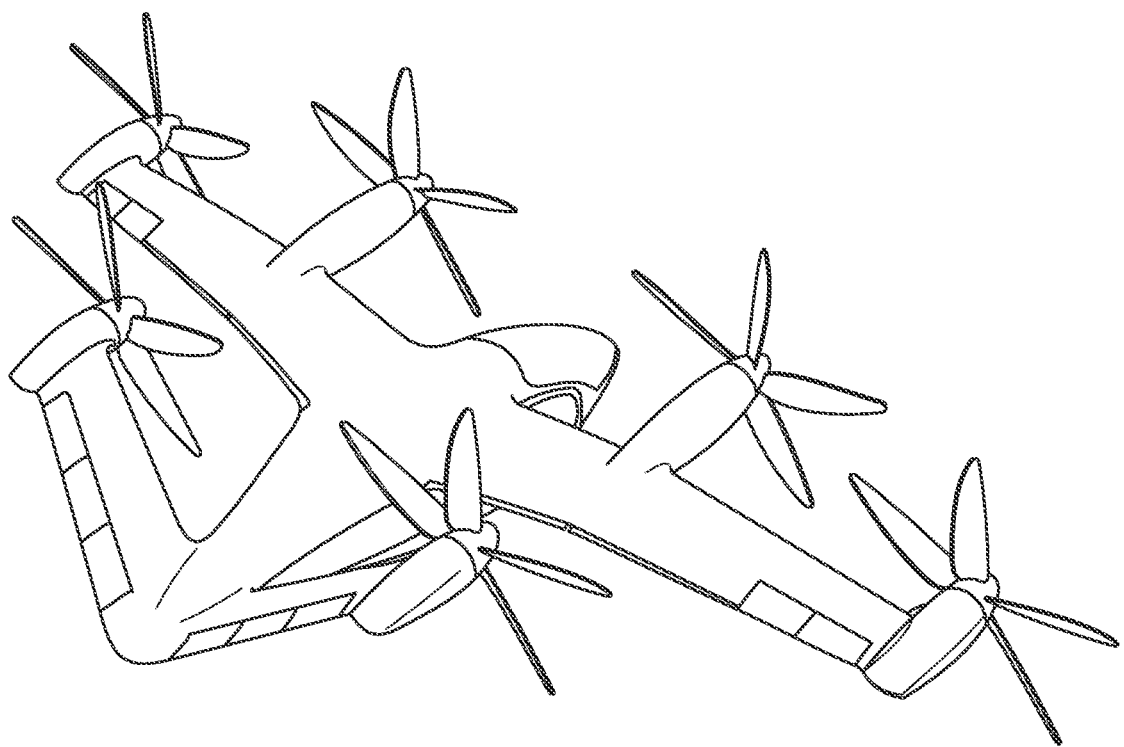

As seen in top view in FIG. 1D, the propulsion assemblies are positioned at different distances from the aircraft center of mass, in two axes. Attitude control during vertical take-off and landing may be manipulated by varying the thrust at each of the propulsion assembly locations. In the circumstance of a motor failure during vertical take-off or landing, and especially a motor failure at the wing outboard propulsion assembly, the attitude of the aircraft may be maintained by implemented fault tolerance strategies described herein.

The aerial vehicle 200 is seen with two passenger seats side by side, as well as landing gear under the body 201. Although two passenger seats are illustrated, other numbers of passengers may be accommodated in differing embodiments of the present invention.

Figure 1G:
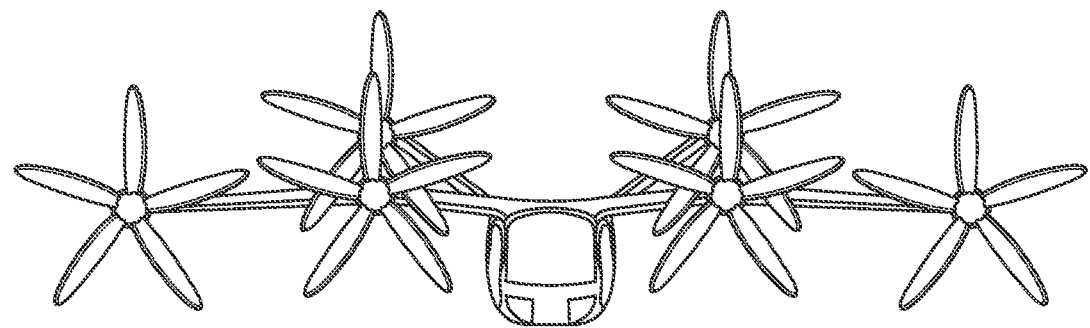
Figure 1H:
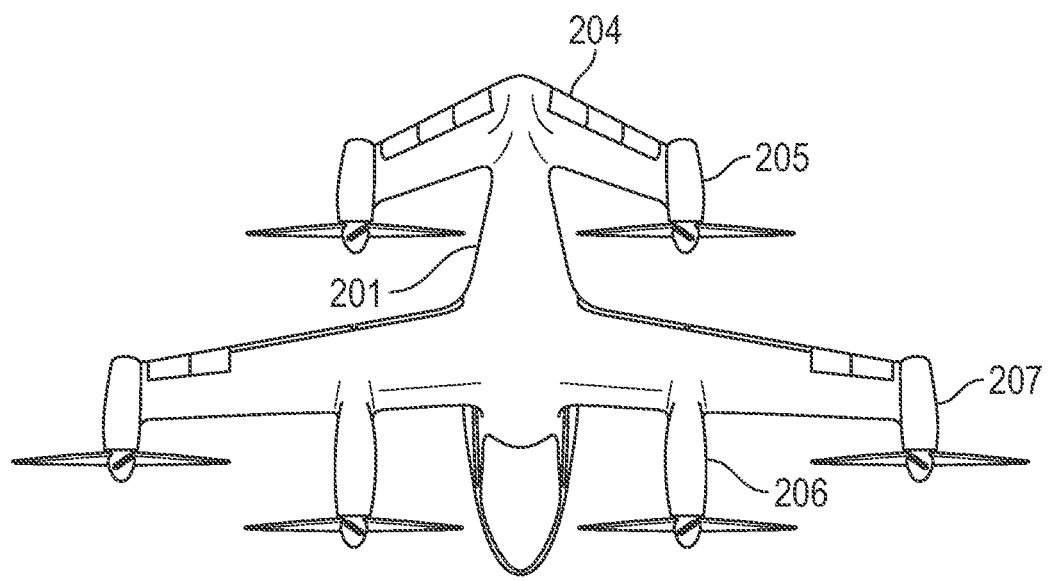
Figure 1I:
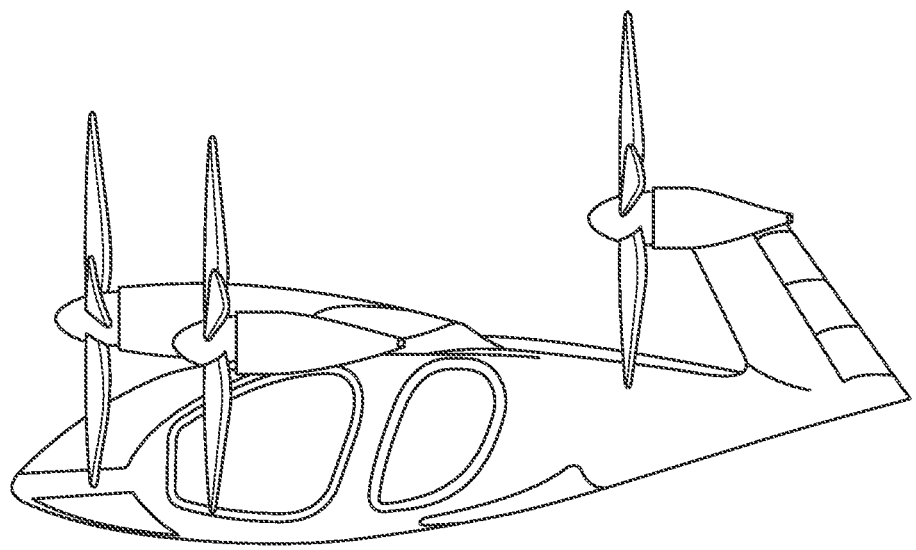
FIGS. 1I-1K are of a VTOL aircraft transitioning from a forward flight configuration to a vertical take-off and landing configuration according to some embodiments of the present invention.
Figure 1J:
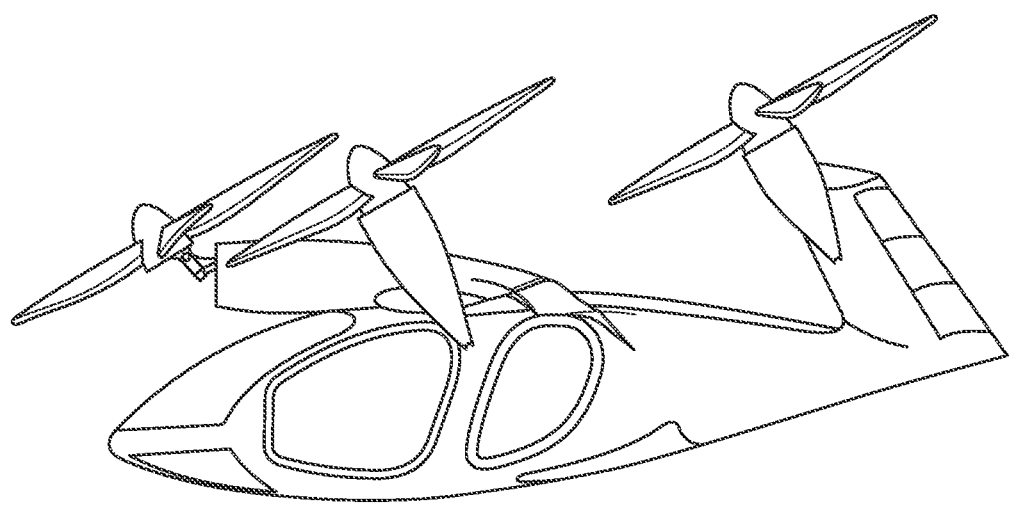
Figure 1K:
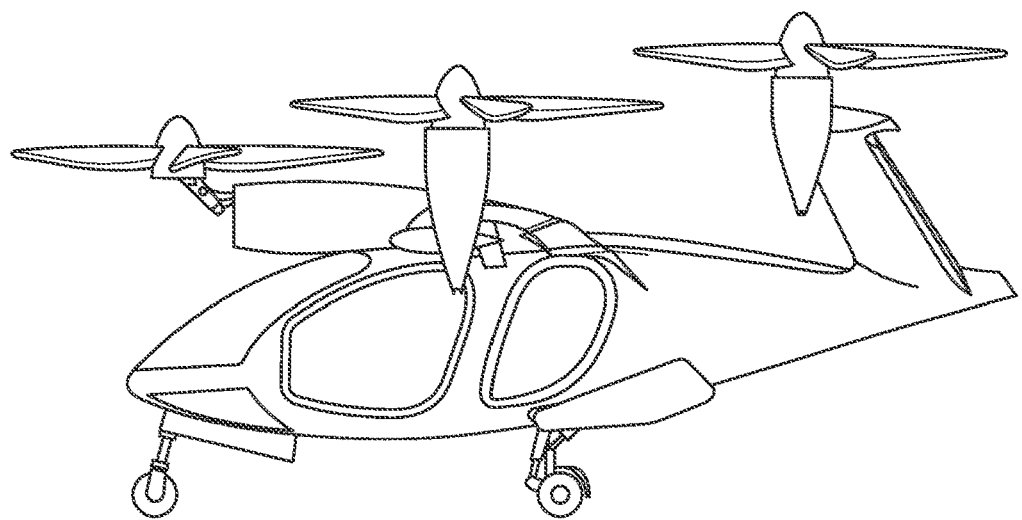

FIGS. 1E through 1H illustrates the aerial vehicle 200 in a forward flight configuration. In this configuration, the propulsion assemblies are positioned to provide forward thrust during horizontal flight. As seen in FIG. 1H, the centers of mass of the motors and of the propellers may be forward of the leading edge of the wings in the forward flight configuration. As seen in FIG. 1G, the propulsion assemblies 205 on the rear stabilizers 204 may be at a different elevation that the propulsion assemblies 206, 207 on the wings. In the circumstance of a motor failure during forward flight, the attitude of the aircraft may be maintained by implementing fault tolerance strategies described herein.

In some aspects, all or a portion of the wing mounted propulsion assemblies may be adapted to be used in a forward flight configuration, while other wing mounted propellers may be adapted to be fully stowed during regular, forward, flight. The aerial vehicle 200 may have two propulsion assemblies on the right wing 203 and two propulsion assemblies on the left wing 202. The inboard propulsion assemblies on each wing may have wing mounted rotors that are adapted to flip up into a deployed position for vertical take-off and landing, to be moved back towards a stowed position during transition to forward flight, and then to have their blades stowed, and nested, during forward flight. The outboard propulsion assembly 207 may pivot in unison from a horizontal to a vertical thrust configuration.

Similarly, the each rear stabilizer 204 may have propulsion assemblies mounted to it, both of which are adapted to be used during vertical take-off and landing, and transition, modes. In some aspects, all of the propulsion assemblies designs are the same, with a subset used with their main blades for forward flight. In some aspects, all of the propulsion assemblies designs are the same, with all propellers used for forward flight. In some aspects, there may be a different number of propulsion assemblies units mounted to the rear stabilizer 204.

The motors driving the wing mounted propulsion assemblies 206, 207 and the motors driving the rear stabilizer mounted propulsion assemblies may each have two sets of windings. In some aspects, both winding sets are powered during flight. In some aspects, each winding of the motor is powered by a different battery circuit. In some aspects, each motor may have more than two sets of windings.

Figure 2A:
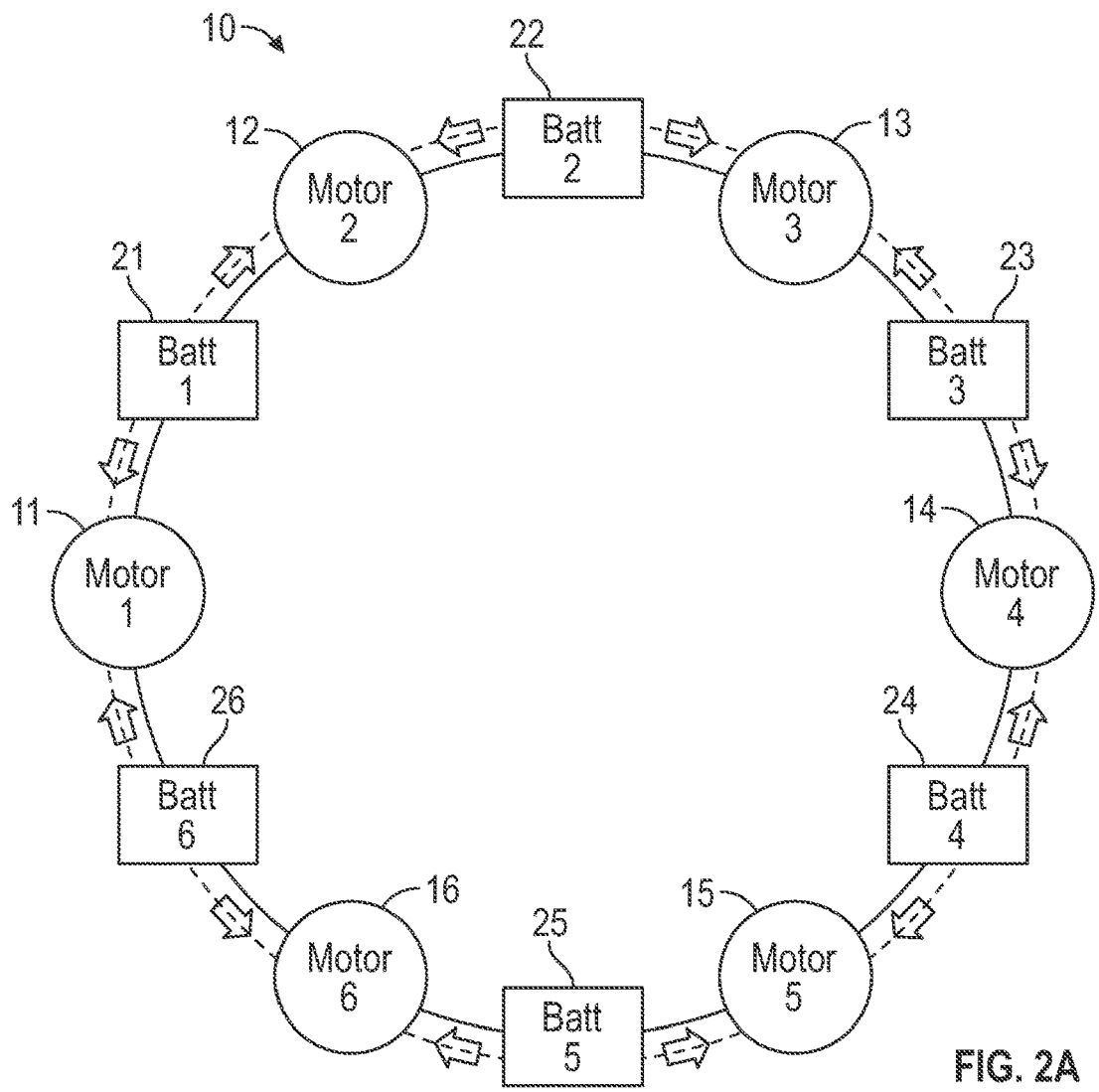
FIG. 2A is a layout of a flight system with a ring architecture according to some embodiments of the present invention.

In some embodiments, the electric motors of the aerial vehicle are powered by rechargeable batteries. The use of multiple batteries driving one or more power busses enhances reliability, in the case of a single battery failure. In some embodiments, the batteries reside within the vehicle body on a rack with adjustable position such that the vehicle balance may be adjusted depending upon the weight of the pilot. FIG. 2A illustrates a battery location layout for a six battery system according to some embodiments of the present invention.

Figure 2B:
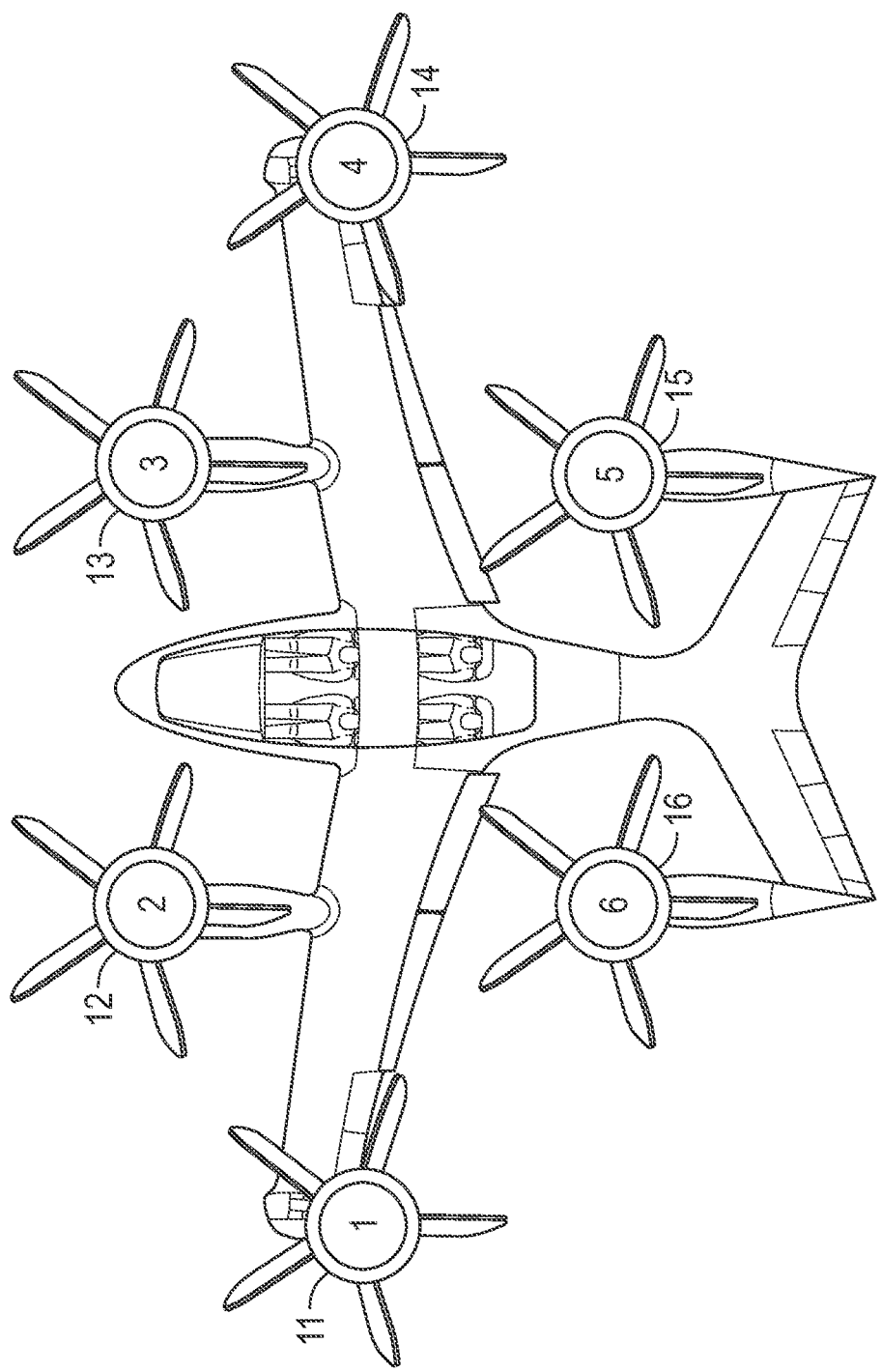
FIG. 2B is a layout identifying motor locations for the ring architecture according to some embodiments of the present invention.
Figure 2C:
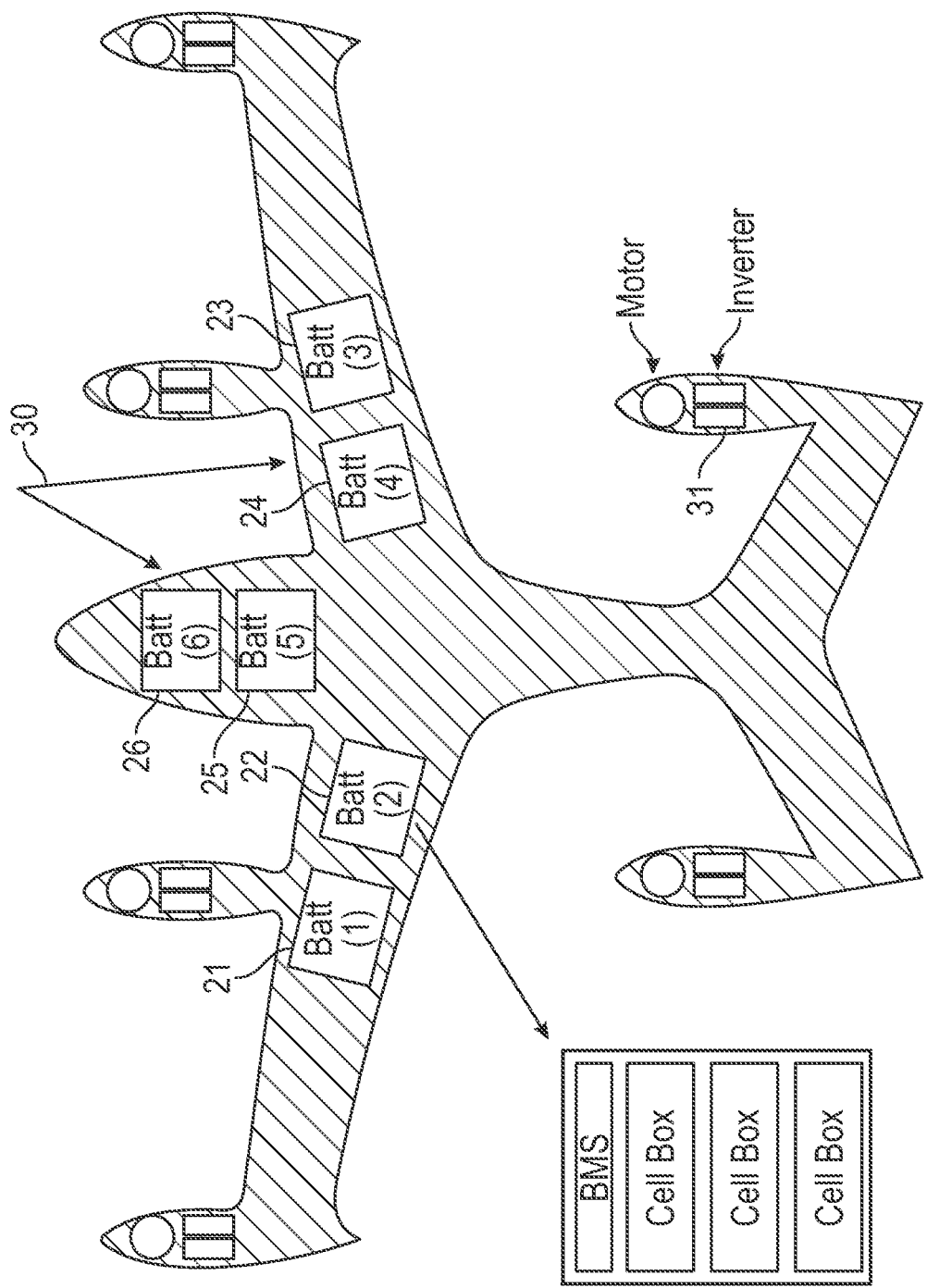
FIG. 2C is a layout of battery locations according to some embodiments of the present invention.

In some embodiments, as seen in FIG. 2A, a high reliability power system 10 for an electrically powered vertical take-off and landing aircraft has six motors and six batteries in a ring architecture. In this exemplary configuration, there are six motors and six batteries. Each of the batteries provides power to two motors, and each motor receives power from two batteries. FIG. 2B illustrates a layout of six motors on a VTOL aircraft in an exemplary embodiment using six propulsion assemblies and six batteries. FIG. 2C illustrates a layout of six batteries in a VTOL aircraft in an exemplary embodiment using six propulsion assemblies and six batteries. In an exemplary ring embodiment, there are six batteries and six motors. Each of the motors is powered by two separate batteries. The disparate locations 30 of the batteries also enhance the reliability and fault tolerance of the power system architecture. Each battery is powering two separate motors. In some aspects, each of the motors is wound with two sets of windings, and each set of windings receives power from a different battery. As discussed below with regard to FIG. 7, each of the six batteries supplies two power inverters 31, for a total of 12 power inverters. The nominal voltage of the batteries is 600V. Each of the six propulsion motors has two sets of windings, with each motor powered by two inverters, one for each set of windings. The two inverters powering a single motor each are supplied power by different batteries.

In an exemplary six motor six battery embodiment 10, the first motor 11 is coupled the sixth battery 26 and the first battery 21. The second motor 12 is coupled to the first battery 21 and the second battery 22. The third motor 13 is coupled to the second battery 22 and the third battery 23.

The fourth motor 14 is coupled to the third battery 23 and the fourth battery 24. The fifth motor 15 is coupled to the fourth battery 24 and the fifth battery 25. The sixth motor 16 is coupled to the fifth battery 25 and the sixth battery 26. In a nominal operating scenario, each battery splits its power distribution evenly between the two motors to which it is coupled, and each motor receives an equal amount of power from each battery to which it is coupled.

The fault tolerant aspect of the power system architecture according to embodiments of the present invention is adapted to withstand, and respond to, at least the following failures: the failure of a battery; the failure of a motor; or the failure of a motor invertor.

Figure 3:
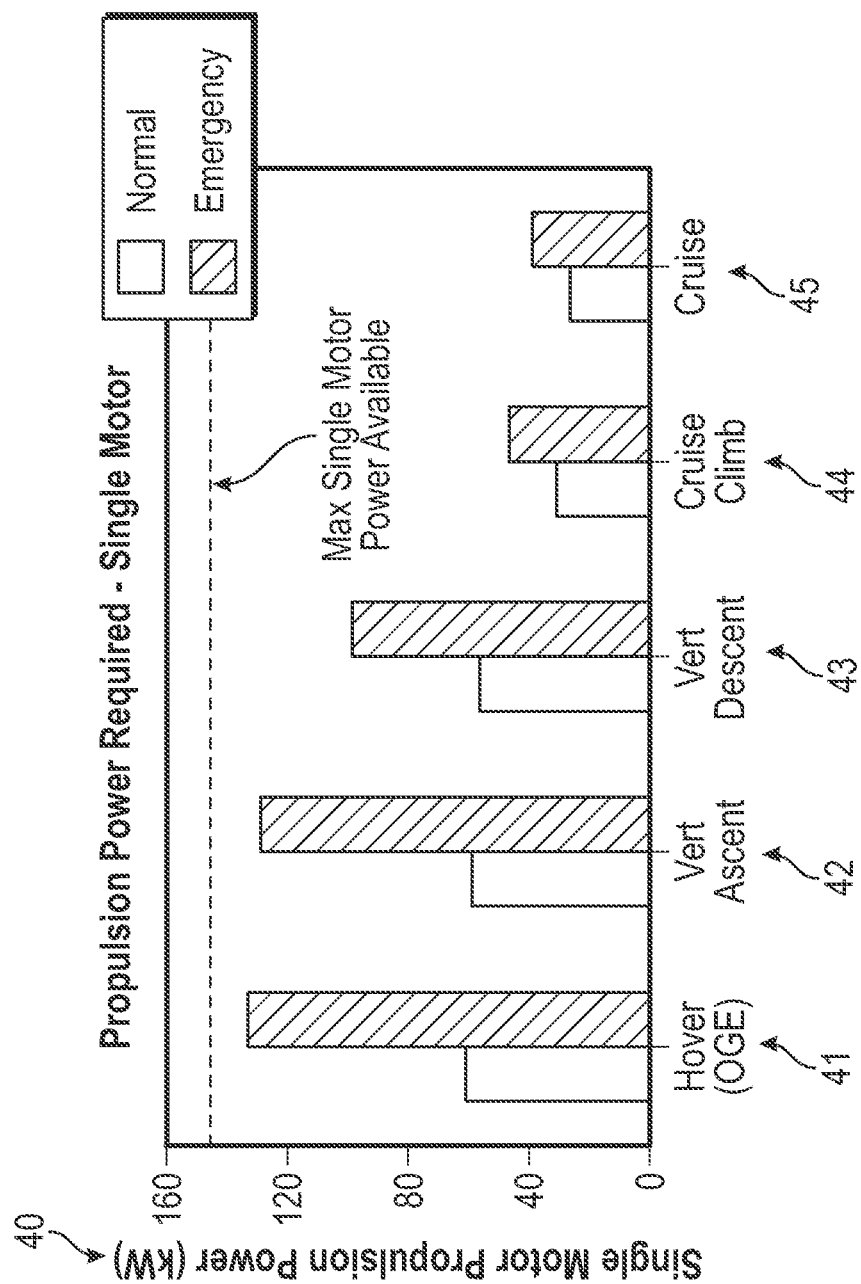
FIG. 3 is a motor power chart according to some embodiments of the present invention.

FIG. 3 is a bar graph (with bar pairs for each operating mode) of the power required for a single motor 40 in the six motor embodiment. The blue vertical bars (on the left side of the bar pair for each mode) illustrate nominal (normal) operating power, per motor, for the five different flight phases: hover 41, vertical ascent 42, vertical descent 43, cruise climb 44, and cruise 45. The hover, vertical ascent, and vertical descent modes are VTOL modes wherein the motors are rotated to a vertical thrust position as seen in FIGS. 1A-1D. The cruise climb and cruise phases are with the motors in a forward flight position, as seen in FIG. 1E-1H. The red vertical bars (on the right side of the bar pair for each mode) represent emergency phase operation, as discussed below.

As seen in FIG. 3, the illustrative embodiment of a six motor six battery ring architecture system runs about 60 kW per motor in a VTOL mode during nominal conditions. This 60 kW compares to approximately the 150 kW maximum available power. In the case of a motor failure, however, more power may be diverted to remaining motors to maintain attitude and altitude control, as discussed further below.

Figure 4:
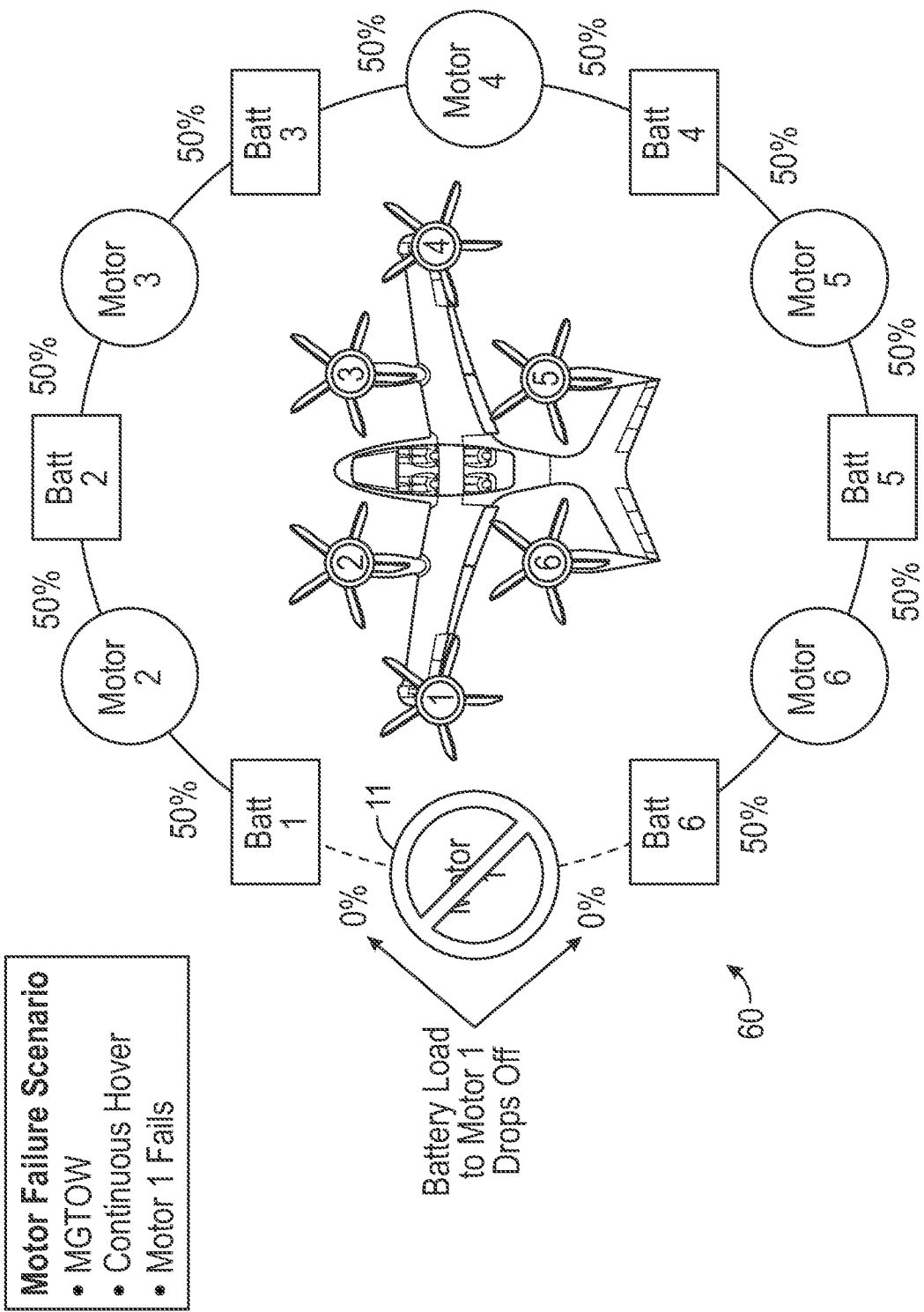
FIG. 4 is a failure scenario layout according to some embodiments of the present invention.
Figure 5:
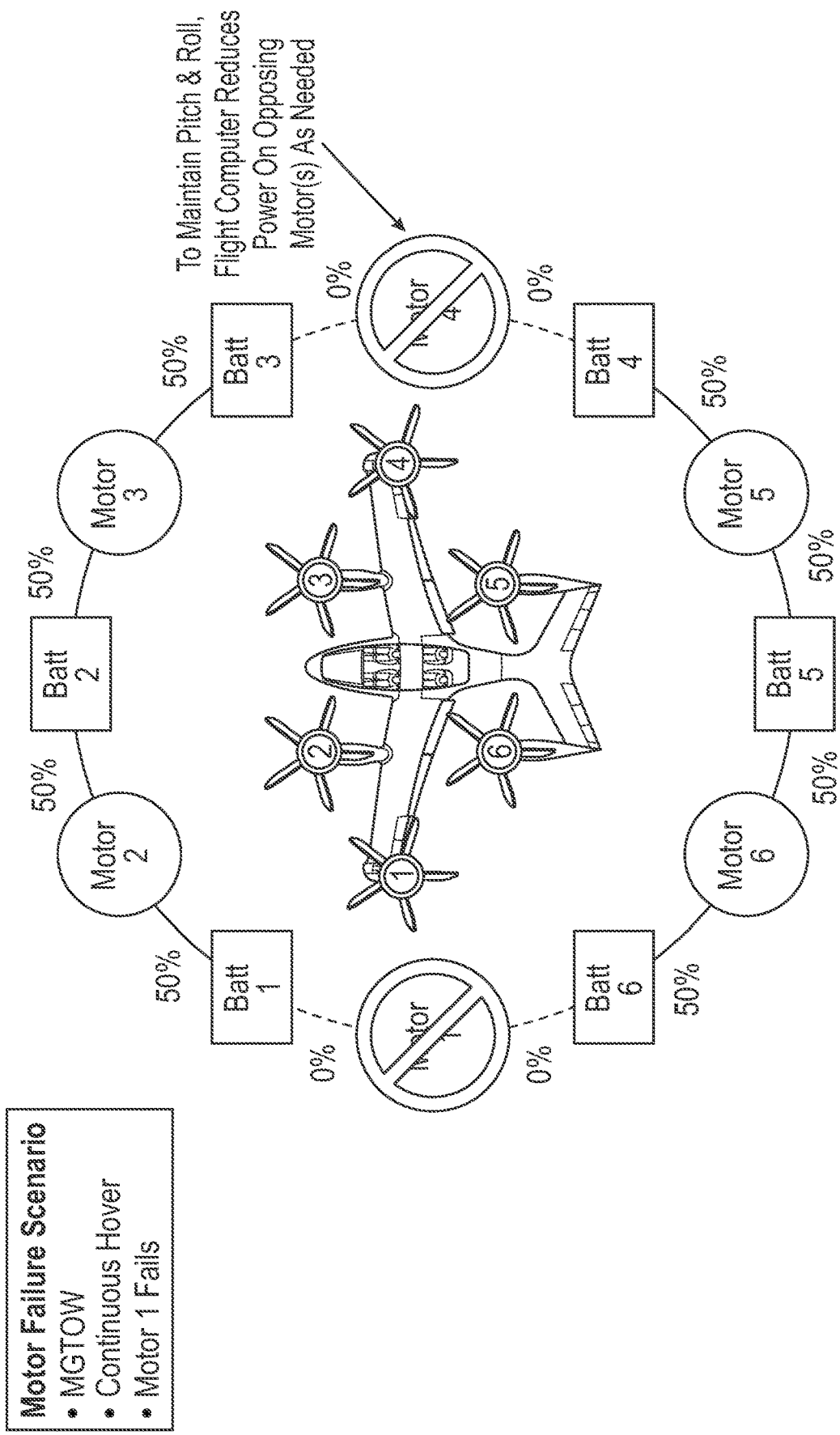
FIG. 5 is a failure compensation layout according to some embodiments of the present invention.
Figure 6:
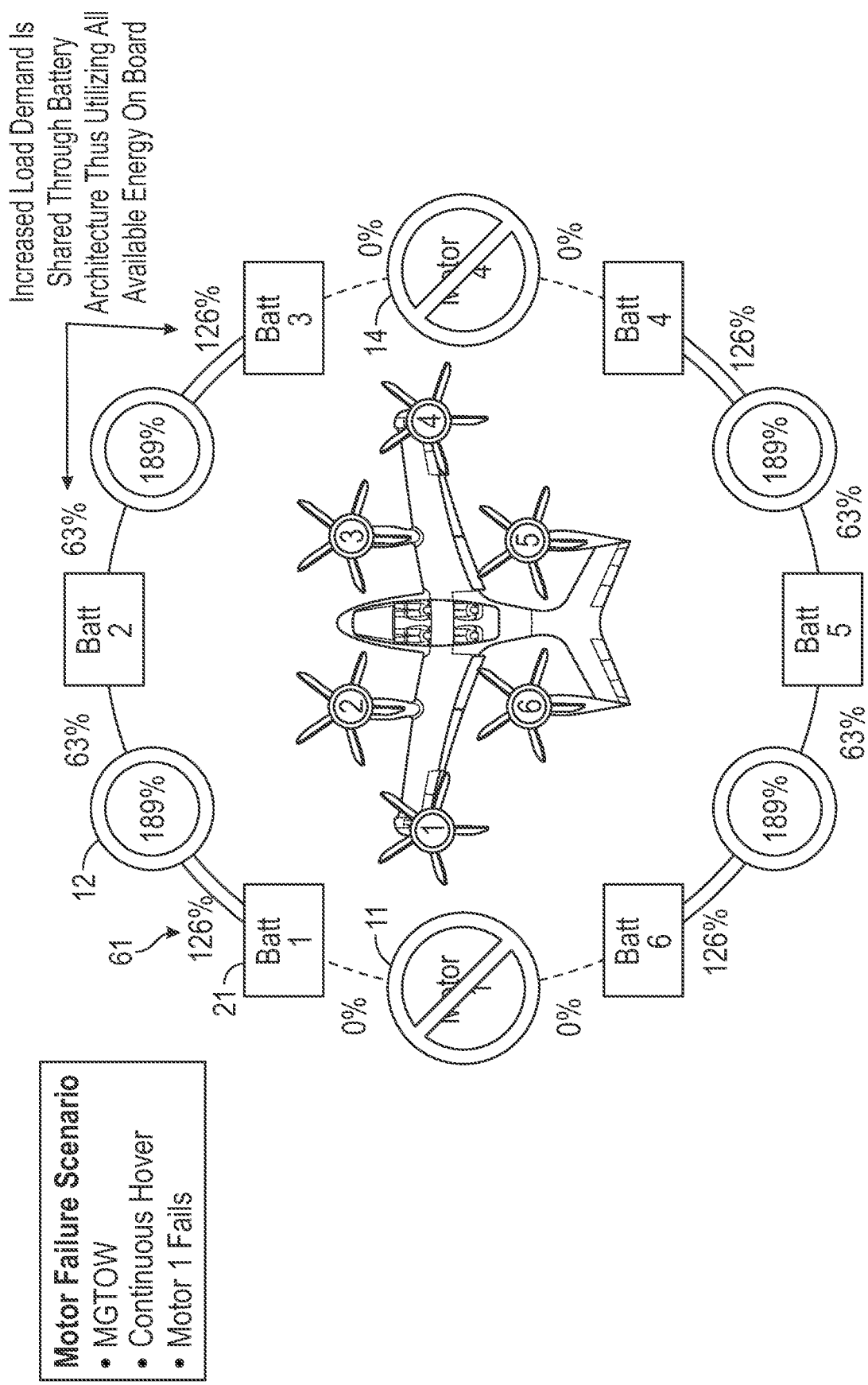
FIG. 6 is a failure compensation layout according to some embodiments of the present invention.

FIG. 4 illustrates a potential failure mode 60 wherein the first motor fails. As seen in the representation motor layout, the loss of the first motor 11 represents loss of thrust at the far port motor, which will have a significant impact on the attitude of the aircraft. The flight computer may immediately sense at least two things: first, that the motor has quit drawing current; second, that there is a disruption to the attitude of the aircraft. In order to maintain balance in the aircraft, the flight control computer will reduce power to the opposing motor(s) as needed. In this example, as seen in FIG. 5, the power to the fourth motor 14 will be reduced. The loss of lift due to the shutdown of two motors requires that the remaining four motors take more power and deliver more lift. FIG. 6 illustrates how the increased load demands in the second, third, fifth, and sixth motors are met by distributing more power from the batteries. Looking again at FIG. 3, the red vertical bars illustrate the power delivery required with the motor failure and then the motor shutdown of the opposing motor. The power down of the fourth motor and the increase in power to the second, third, fifth, and sixth motors may take place simultaneously in some aspects. In some aspects, the power down of the fourth motor and the increase in power to the second, third, fifth, and sixth motors may take place sequentially.

As seen in FIG. 6, with the first motor 11 failed and the fourth motor 14 powered down to balance the aircraft, the first battery 21 now only delivers power to the second motor 12. Similarly, the third battery only delivers power to the third motor, the fourth battery only delivers power to the fifth motor, and the sixth battery only delivers power to the sixth motor. The second battery delivers power to both the second and third motors, and the fifth battery delivers power to the fifth and sixth motors. Although illustrated as having the fourth motor running down to 0% power, in some aspects the cross motor may be run at a low level, in the range of 0-20% of nominal power, for example. As the first and sixth battery are only providing to a single motor, and as the third and fourth battery are primarily only delivering power to a single motor, these batteries will provide more current 61 to their respective windings in the second, third, fifth, and sixth motors. The second and fifth batteries will split evenly between their adjacent motors. In the failure scenario illustrated in FIG. 6, each battery may be putting out the same amount of power, but two batteries are splitting their power delivery, and four batteries are providing (or substantially providing) power to only a single motor. The increased load demand of the motors in this emergency mode is shared through the battery architecture to utilize the available energy onboard the aircraft. Although one motor has been disabled and a second motor has been powered down to accommodate attitude control concerns, each battery is still being used and delivering power.

Figure 7:
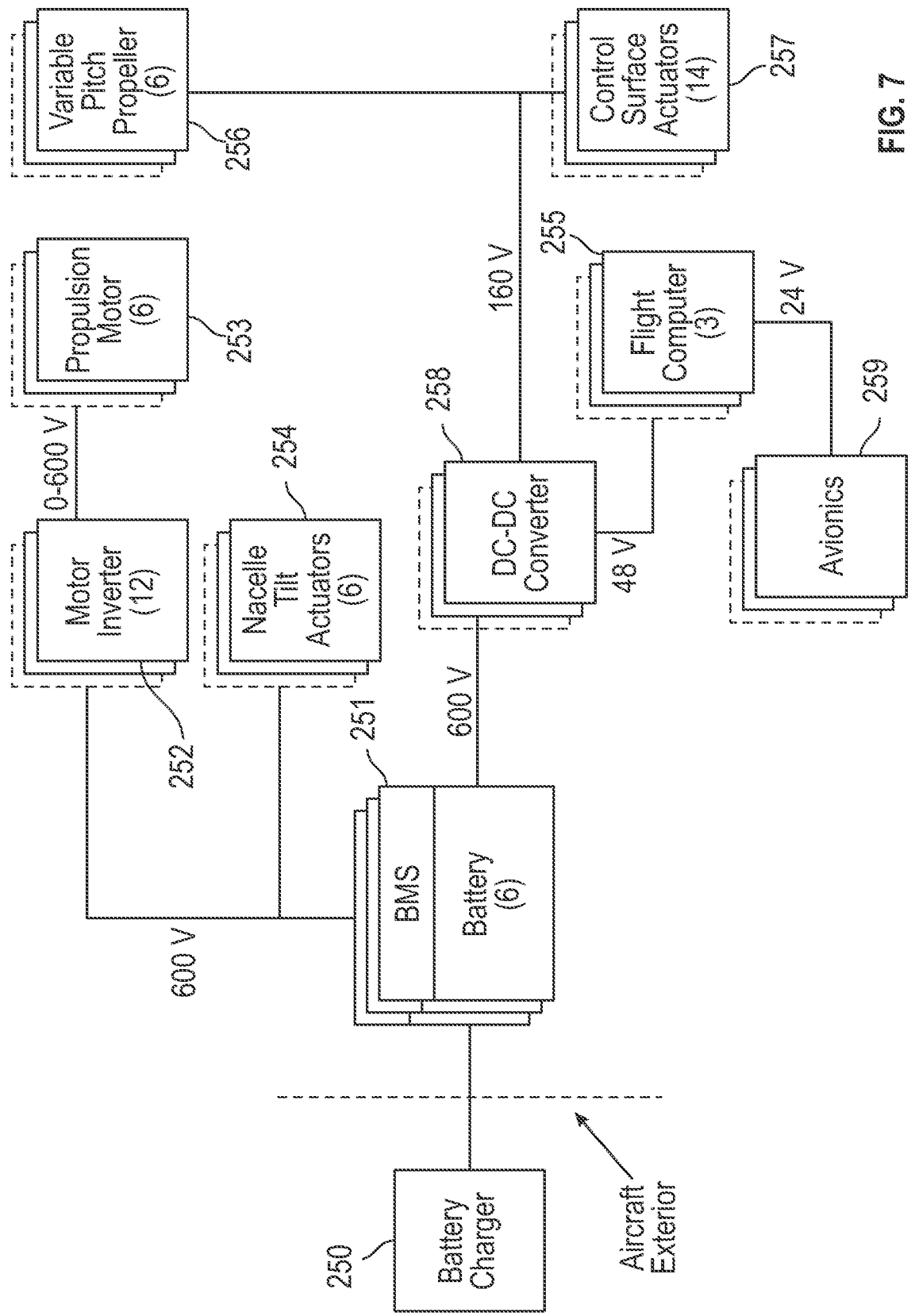
FIG. 7 is a power architecture layout according to some embodiments of the present invention.

In some embodiments, the vertical take-off and landing aircraft has an autonomous attitude control system adapted to withstand a power link failure, or complete motor failure, in a multi-battery system by load sharing to better equate battery discharge levels. In some aspects, each motor is driven on multiple complementary winding sets, with each winding set using a different load link and being driven by a different battery. FIG. 7 is an illustrative embodiment of the electrical system power architecture for a six motor six battery aircraft. Each of the six batteries 251 supplies two power inverters, for a total of 12 power inverters 252. The nominal voltage of the batteries is 600V. Each of the six propulsion motors 253 has two sets of windings, with each motor powered by two inverters, one for each set of windings. The two inverters powering a single motor each are supplied power by different batteries. In addition to supplying power to the motor inverters, the battery also supplies power to the rotor deployment mechanisms 254 (nacelle tilt actuators) which are used to deploy and stow the rotors during various flight modes (vertical take-off and landing configuration, forward flight configuration, and transition between).

A flight computer 255 monitors the current from each of the twelve motor inverters 252 which are supplying power to the twelve winding sets in the six motors 253. The flight computer 255 may also control the motor current supplied to each of the 12 sets of windings of the six motors. In some embodiments, the batteries 251 also supply power to the blade pitch motors and position encoders of the variable pitch propellers 256. The batteries also supply power to control surface actuators 257 used to position various control surfaces on the airplane. The blade pitch motors and the control surface actuators 257 may receive power run through a DC-DC converter 258, stepping the voltage down from 600V to 160V, for example. A suite of avionics 259 may also be coupled to the flight computer. A battery charger 250 may be used to recharge the batteries 251, and the battery charger may be external to the aircraft and ground based.

In the case of a failure, such as the failure of a motor, or of a power link to a motor, the compensations to power distribution to the various motors from the various batteries, as described above, may be done autonomously and onboard the aircraft. The compensations may be done without needing input from the pilot, for example.

In another failure scenario, a single winding on a motor may fail. In such a scenario, the opposing motor may be powered down somewhat while the motor with a sole remaining winding may be powered up somewhat. The power supplied by the batteries may be moderated to even out the discharge of the various batteries. In yet another failure scenario, a battery may fail. In that case the cross motor may be reduced 10-20%, with the sole battery remaining on the motor with the failed battery/inverter providing extra power, and differential power along the ring used to spread the battery discharge. In the case of a completely failed battery in the ring architecture, which would result in two motors each having one winding set go unpowered, the remaining winding set in each of the adjacent motors would take increased power from that winding set's battery, and there would be differentially adjusted power around the ring in order to best equalize the battery discharge rates. The cross motor would be partially powered down to maintain appropriate discharge rates.

Figure 8:
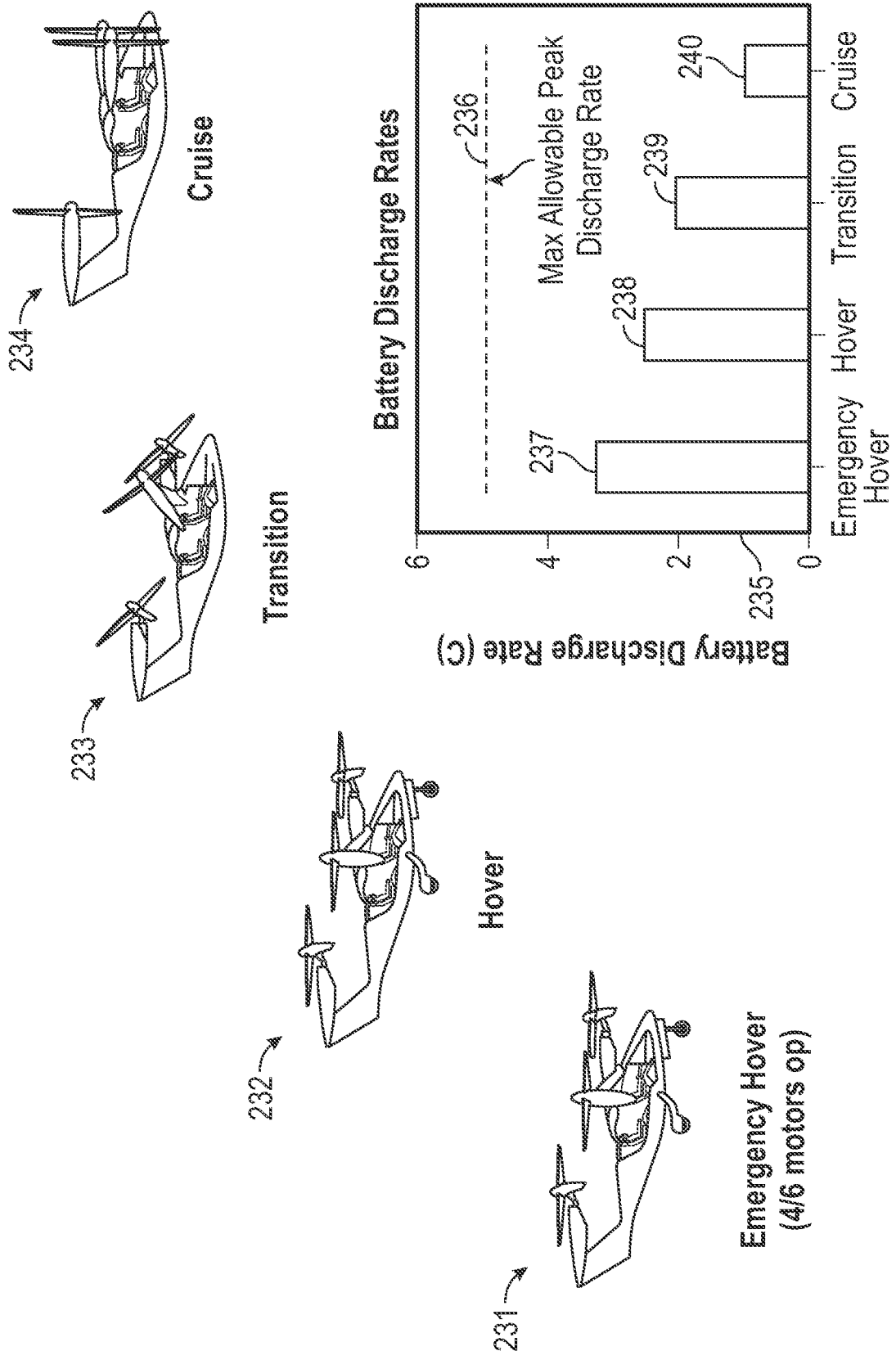
FIG. 8 is a battery discharge chart according to some embodiments of the present invention.

FIG. 8 illustrates four flight modes and a bar chart 235 of the battery discharge rates for each flight mode. The vertical axis in the bar chart is the battery discharge rate C. The battery discharge rate is a normalized coefficient wherein a 1 C discharge rate would discharge the battery in one hour. A 2 C discharge the battery in 30 minutes, a 3 C discharge rate would discharge the battery in 20 minutes, and so on. A maximum peak discharge rate 236, which is about 5 C in this exemplary embodiment, may be set by the limitations of the battery chemistry. The nominal flight modes are hover mode 232, transition mode 233, and cruise mode 234. The cruise discharge rate 240 may be approximately 1 C. As the aircraft approaches for landing, the aircraft will change to a transition mode 233, which may have a transition discharge rate 239 of approximately 2 C. The aircraft will then go into hover mode 232 as it lands, which may have a discharge rate 238 of approximately 2.5 C. In the case of a failed motor, the aircraft may go into an emergency hover mode 231, wherein a cross motor may be powered down to achieve attitude stability. The emergency hover mode discharge rate 237 may be over 3 C.

In an exemplary embodiment, the maximum gross takeoff weight (MGTOW) may be 4200 pounds. The discharge rates are out of ground effect (OGE), with a total energy storage of all batteries of 150 kWh. In the case of an emergency landing in the emergency hover mode 231, the anticipated time using the high discharge rate at the emergency hover mode discharge rate 237 is approximately 1 minute.

Figure 9:
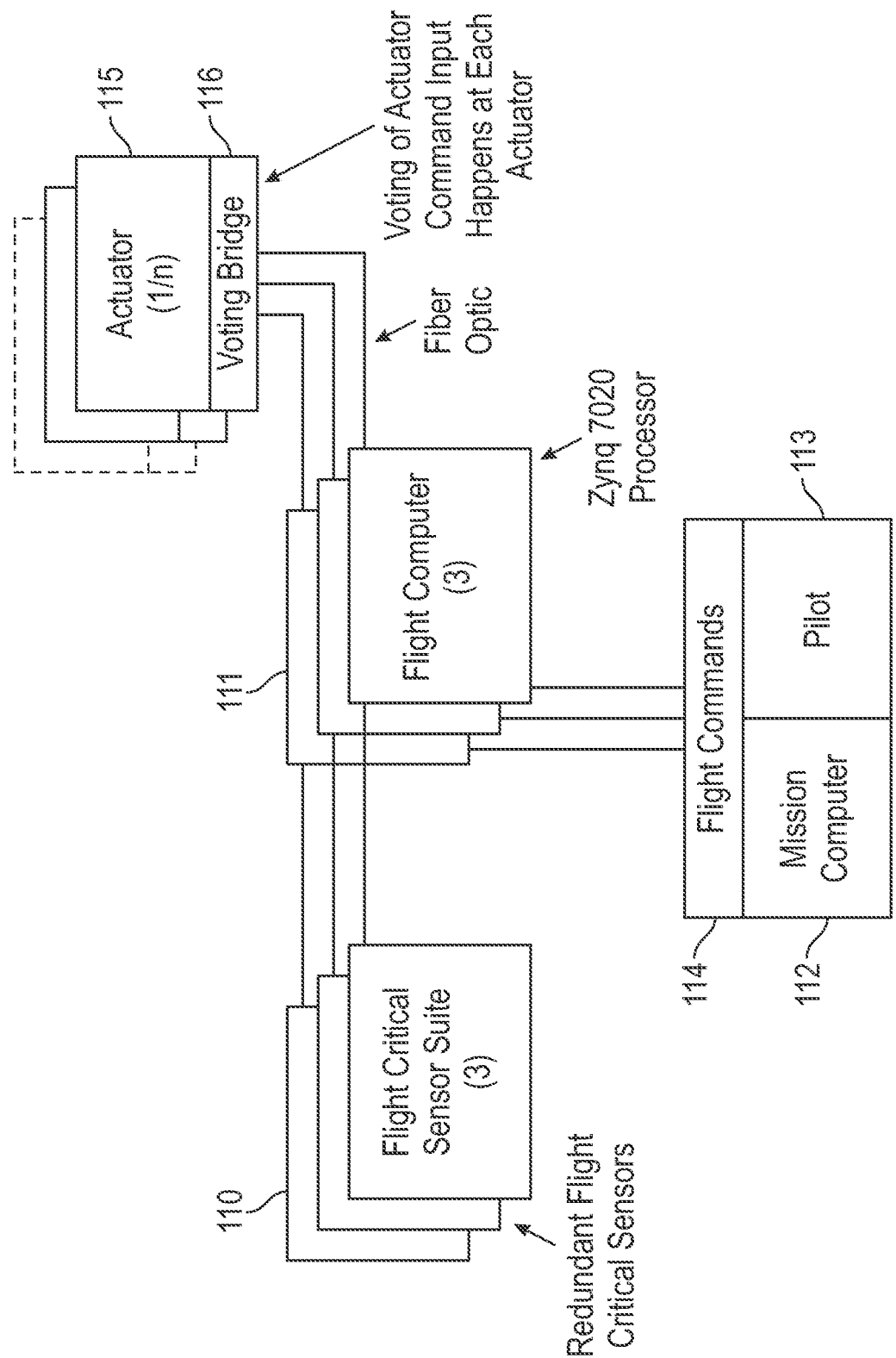
FIG. 9 is a flight control system architecture layout according to some embodiments of the present invention.
Figure 10:
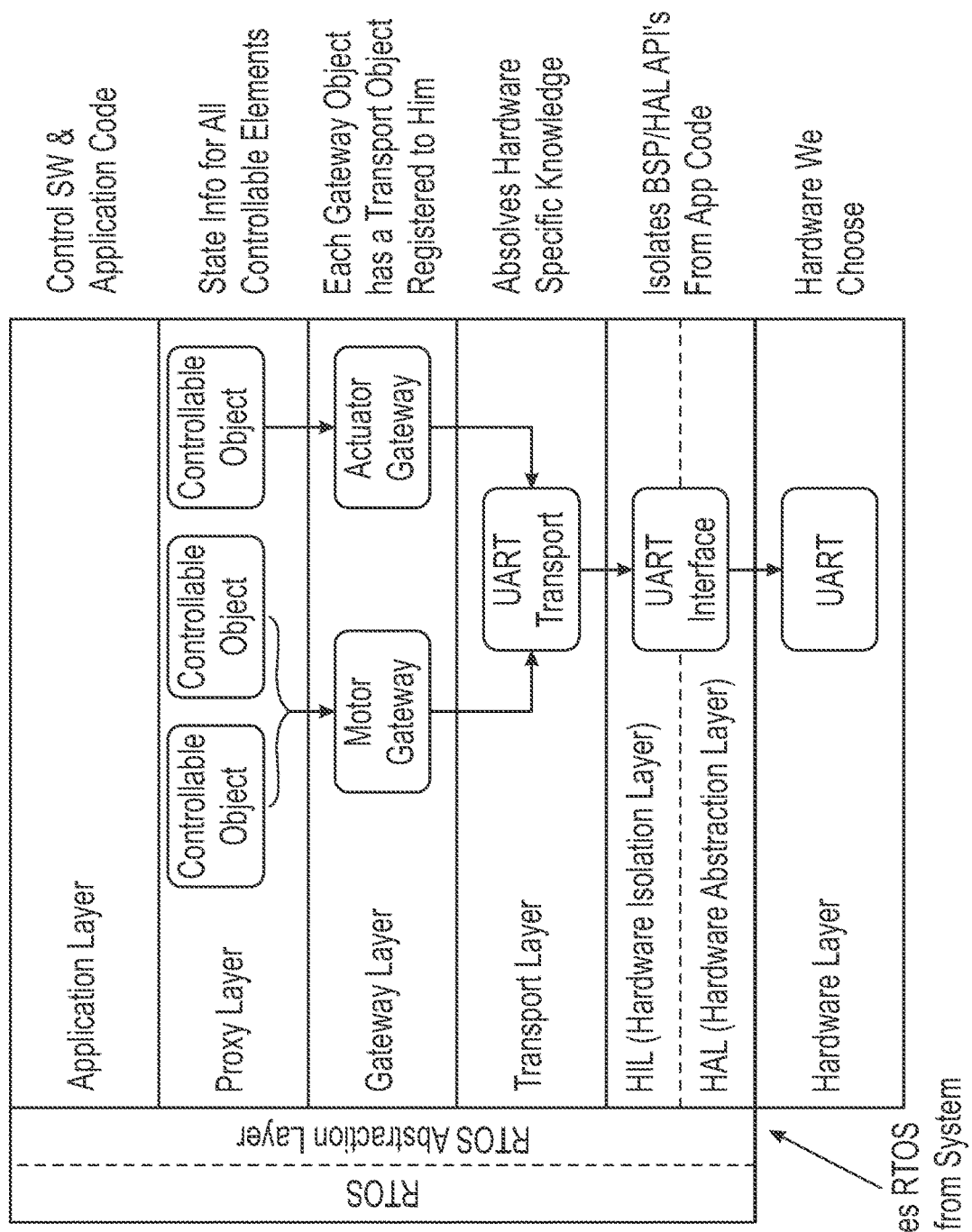
FIG. 10 illustrates flight control software architecture according to some embodiments of the present invention.

FIG. 9 illustrates a flight control system architecture for a high reliability electric powered aircraft according to some embodiments of the present invention. In an exemplary embodiment, the flight computer 111 of the control system receives flight commands 114 from the mission computer 112 and from the pilot 113. The flight computer may also receive inputs from a flight critical sensor suite 110. The flight critical sensors may be triply redundant. The flight computer may be triply redundant. The system may include a voting bridge 116 on each actuator 115. FIG. 10 illustrates the flight control software architecture according to some embodiments of the present invention.

Figure 11A:
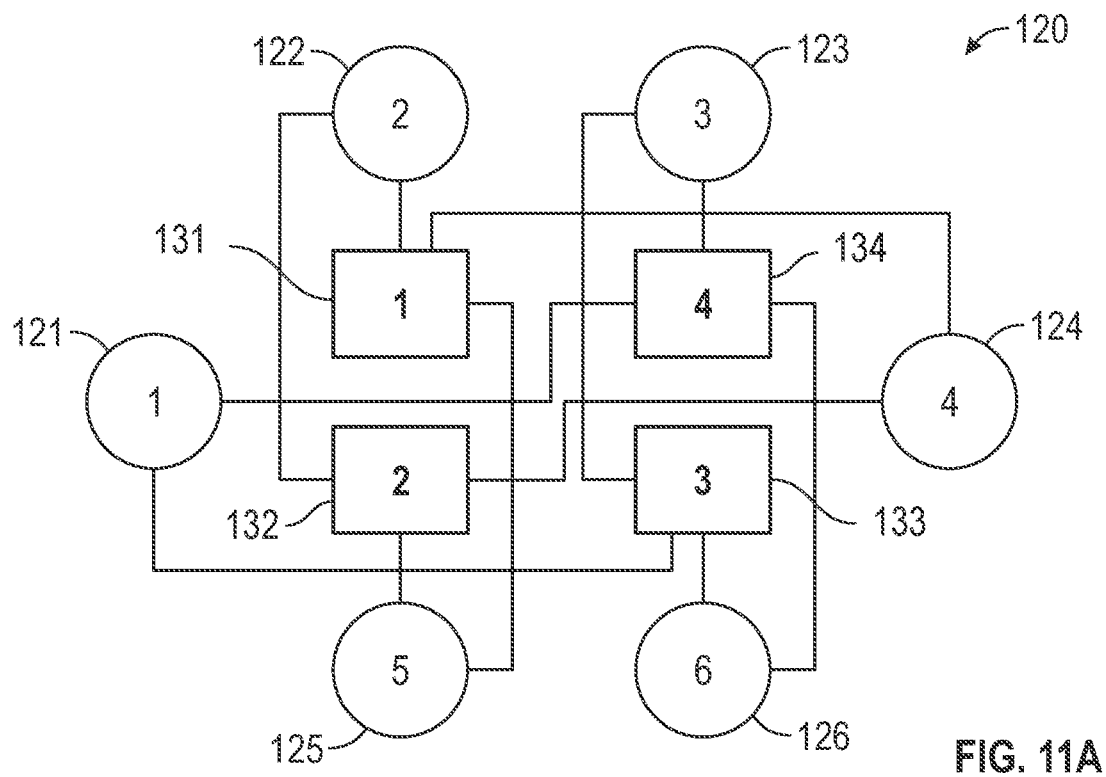
FIG. 11A is a layout of a flight power system with a doublet architecture according to some embodiments of the present invention.

In some embodiments of the present invention, other battery and motor architectures may be used which further enhance the fault tolerance of the system. In some aspects, as seen in FIG. 11A, a doublet architecture 120 is used which uses four batteries to the electric motors of six propulsion assemblies; a left wing tip propulsion assembly motor 121, a left wing propulsion assembly motor 122, a right wing propulsion assembly motor 123, a right wing tip propulsion assembly motor 124, a left rear propulsion assembly motor 125, and a right rear propulsion assembly motor 126. In the doublet architecture, each battery provides power to one or motors on each side of the aircraft longitudinal centerline. By linking a battery that powers the furthest outboard to a motor on the other side of the center line of the aircraft, a battery failure then has its effect more spread out across the aircraft, reducing the amount of attitude offset due to the battery failure. In the case of a motor failure at the first motor 121, for example, there may still be an instantaneous reduction in power to the fourth motor to compensate for the failure. But the compensation regime for power sharing in a doublet architecture using the remaining motors will allow for lower inverter loads in an inverter optimized system as compared to the ring architecture that was disclosed above. Also, the compensation regime for power sharing in a doublet architecture using the remaining motors will allow for lower battery loads in a battery optimized system as compared to the ring architecture.

Figure 11B:
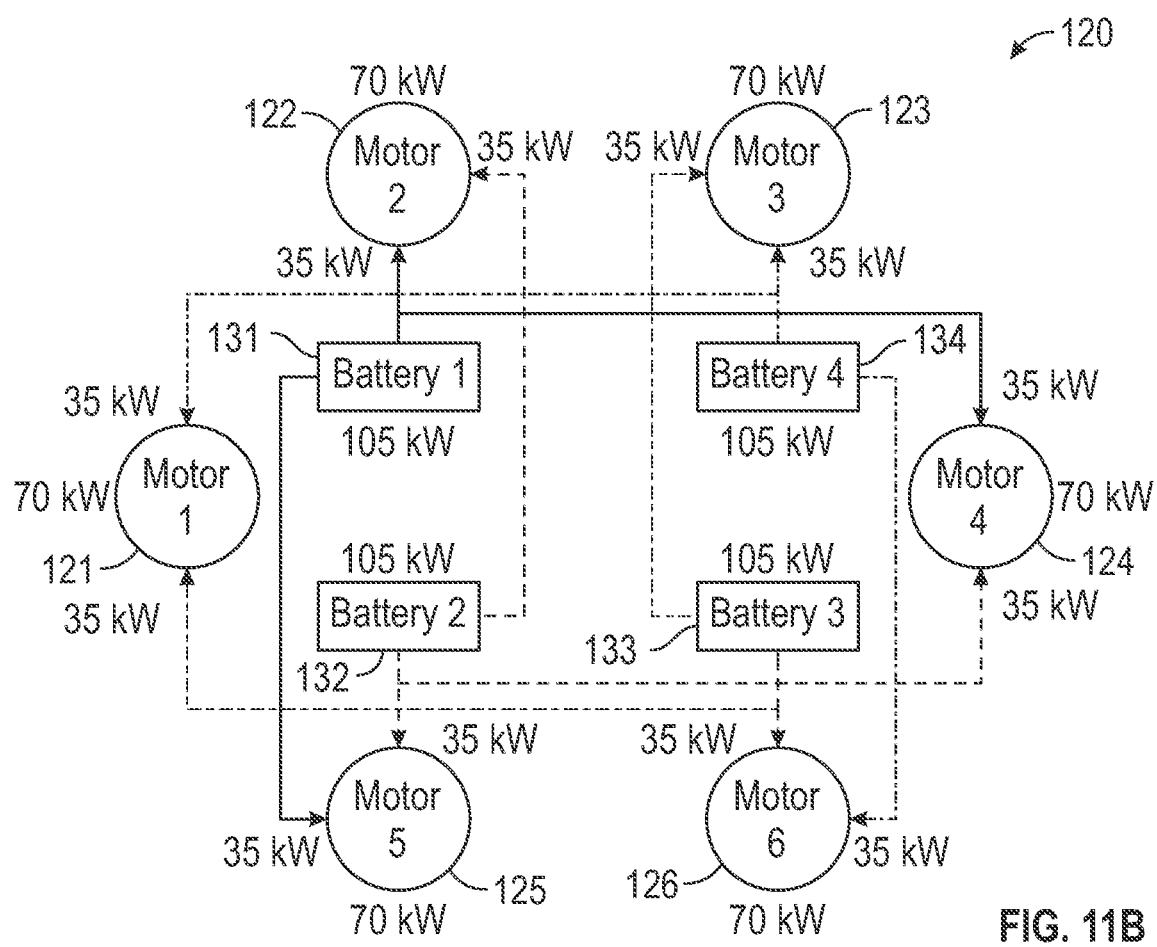
FIG. 11B is a layout of a flight power system with a doublet architecture according to some embodiments of the present invention.

FIG. 11B illustrates a nominal operating condition for the doublet architecture 120 wherein each of the four batteries 131, 132, 133 and 134 provides 35 KW to one winding of three different motors, for a total of 105 kW delivered per battery, and a total of 70 kW received per motor, for a total delivery of 420 kW. Each motor is receiving power from three batteries.

Figure 11C:
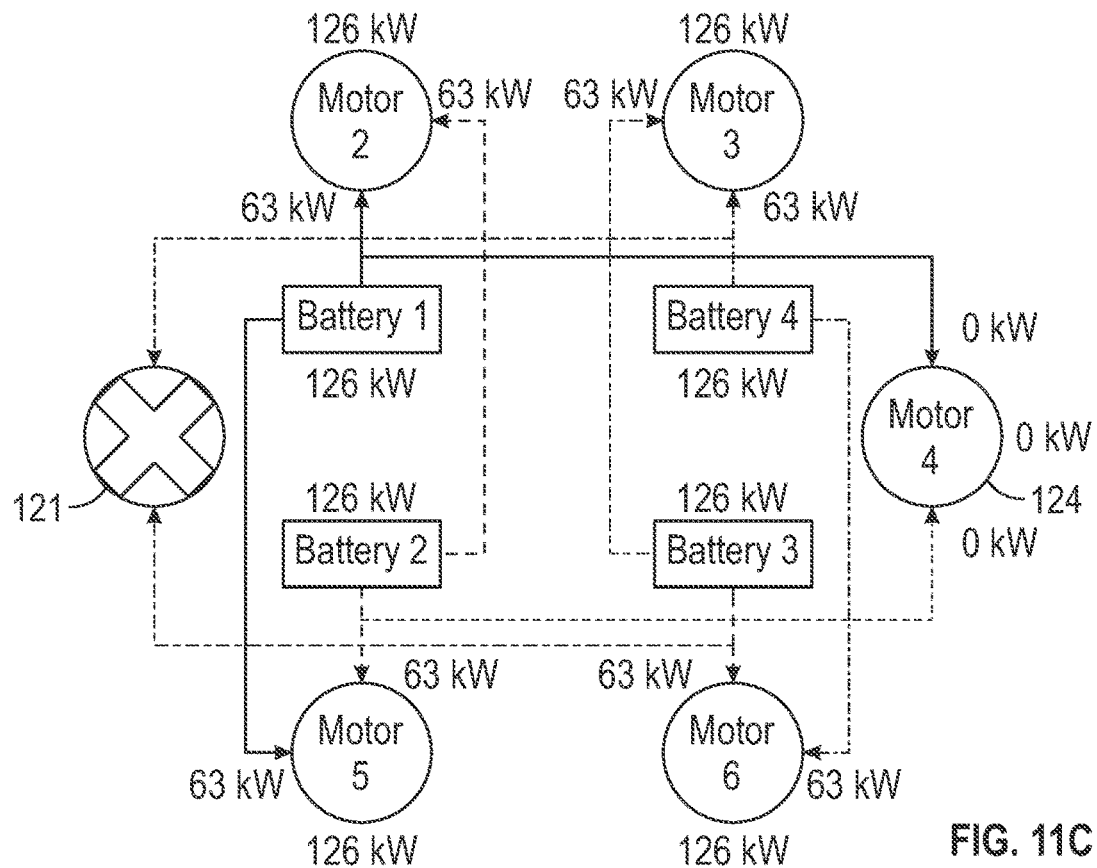
FIG. 11C is a layout of a flight power system with a doublet architecture with a motor failure according to some embodiments of the present invention.

FIG. 11C illustrates a motor failure condition, in this exemplary case the motor 121 of the left wing tip propulsion assembly. As illustrated, the motor 124 on the right wing tip has been unpowered and is no longer drawing any power, in order to offset the loss of the left wing tip motor. Each of the batteries is now powering two motors instead of the prior three, and each motor is receiving power from two batteries, instead of the prior three. Each of the batteries is able to run at the same power output level, and each of the motor windings, and their associated inverters, are also able to run at the same power level.

Figure 11D:
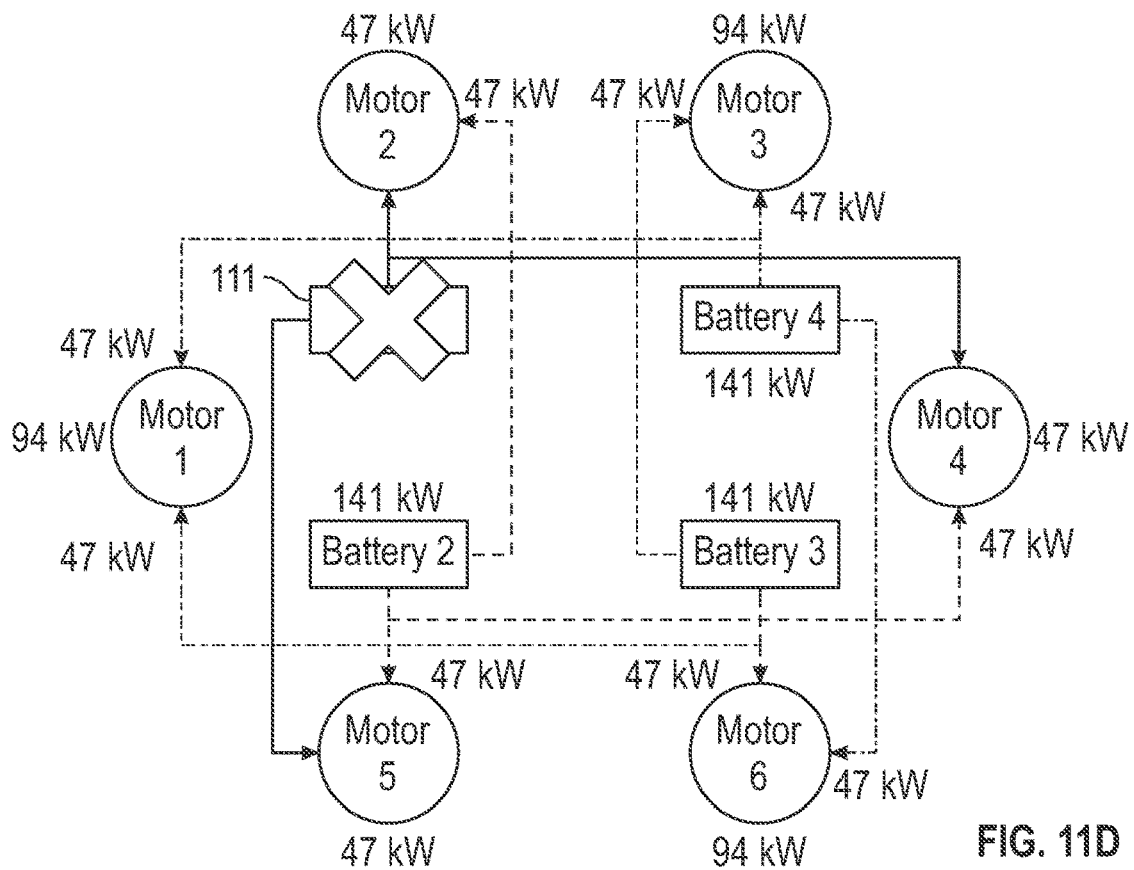
FIG. 11D is a layout of a flight power system with a doublet architecture with a battery failure according to some embodiments of the present invention.

FIG. 11D illustrates a battery failure condition, in this exemplary case the first battery 131. In this circumstance, each remaining battery provides the same power output level, although the different motors run at different power levels in order to balance the thrust generated on each side of the aircraft longitudinal centerline.

Figure 12:
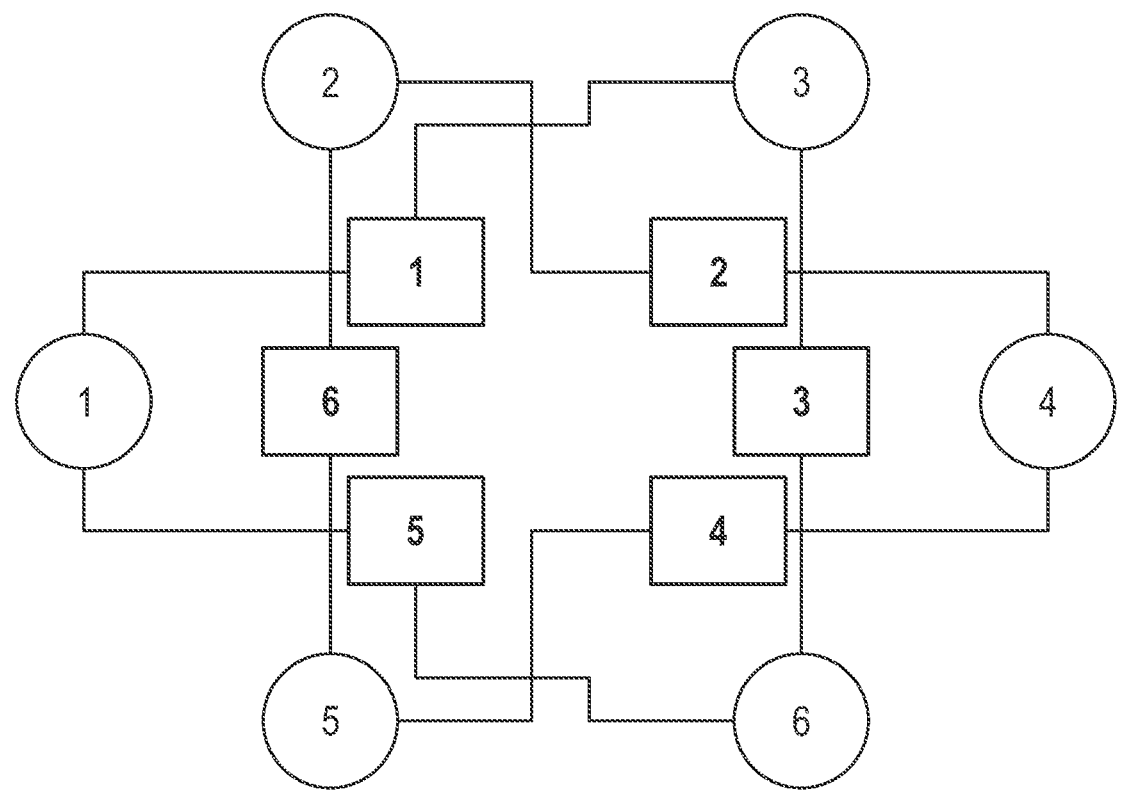
FIG. 12 is a layout of a flight power system with a hexagram architecture according to some embodiments of the present invention.
Figure 15A:
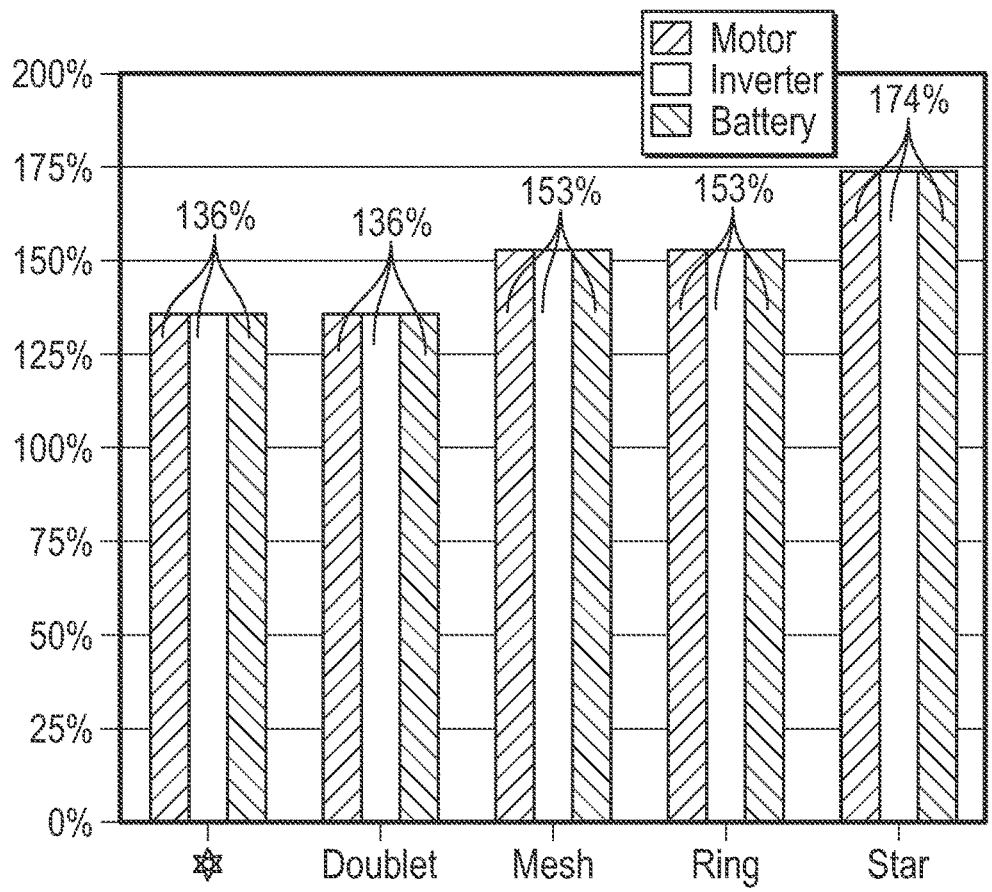
FIGS. 15A-C presents information regarding battery failure operations according to some embodiments of the present invention.
Figure 15B:
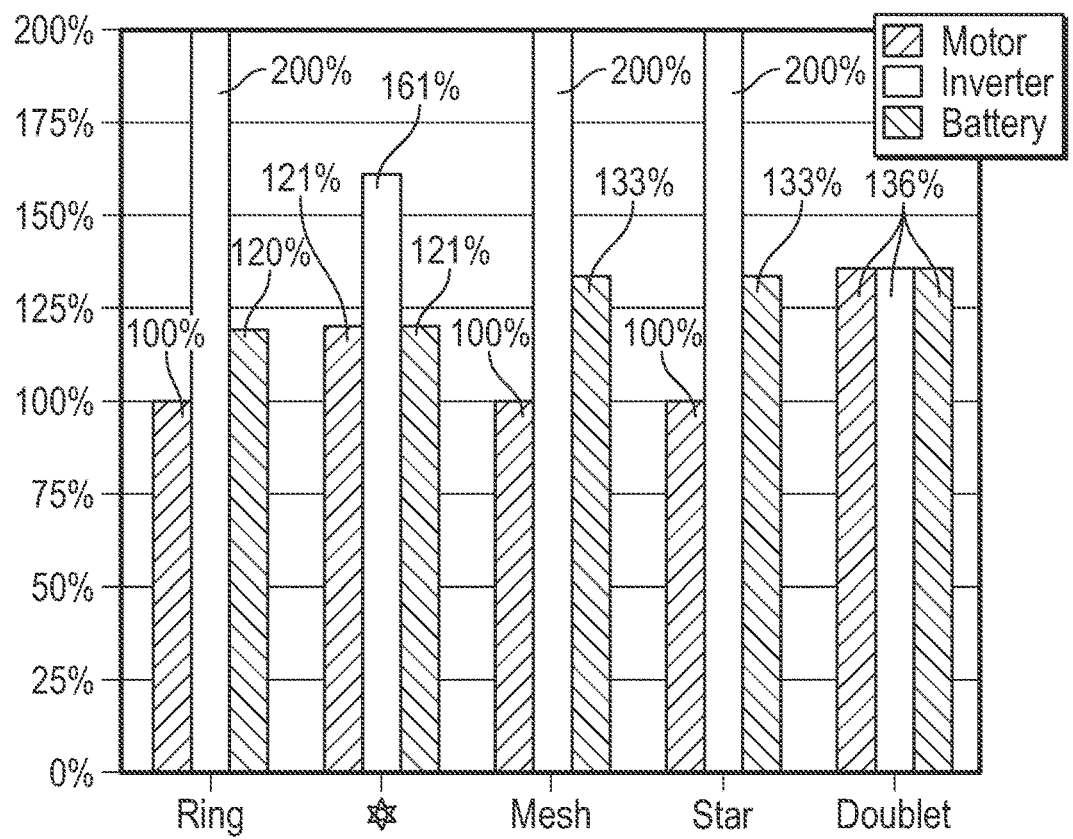
Figure 15C:
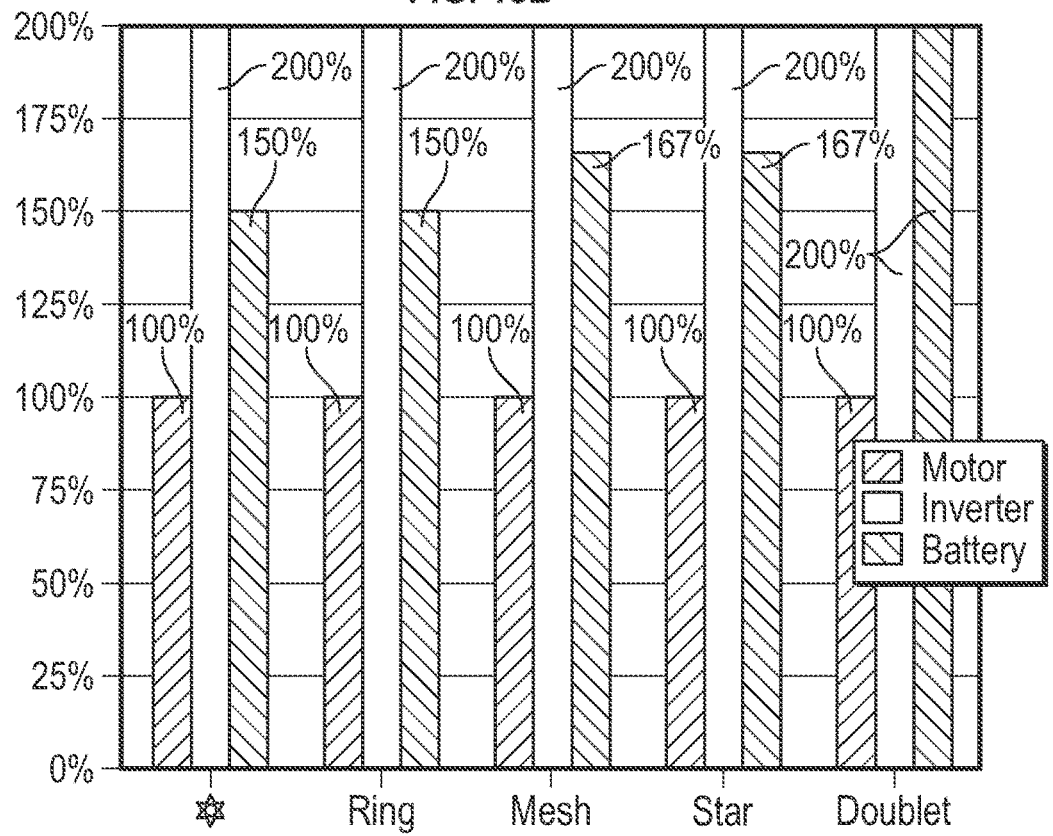

FIG. 12 illustrates a six battery six motor hexagram architecture according to some embodiments of the present invention. In the hexagram architecture illustrated in FIG. 12, each of the six batteries powers two motors, as with the ring architecture. And each motor is powered by two batteries. However, the first battery provides power to the first and third motor, the second battery provides power to the second and fourth motor, and so on. The hexagram architecture creates two separate rings encompassing the first, third, and sixth motors, and the second, fourth, and fifth motors. By linking a battery that powers the furthest outboard to a motor on the other side of the center line of the aircraft, a battery failure then has its effect more spread out across the aircraft, reducing the amount of attitude offset due to the battery failure. In the case of a motor failure at the first motor, for example, there may still be an instantaneous reduction in power to the fourth motor to compensate for the failure. But the compensation regime for power sharing in a hexagonal architecture using the remaining motors will allow for lower inverter loads in an inverter optimized system as compared to the ring architecture. Also, the compensation regime for power sharing in a hexagonal architecture using the remaining motors will allow for lower battery loads in a battery optimized system as compared to the ring architecture. FIGS. 15A to 15C illustrate the maximum loads in the inverters, batteries, and motors for inverter-optimized, battery-optimized, and motor-optimized solutions for the various motor-battery architectures described herein during a battery failure. The hexagram architecture is indicated with a symbol, as opposed to a name like the other architectures, in FIGS. 15A to 15C.

Figure 13:
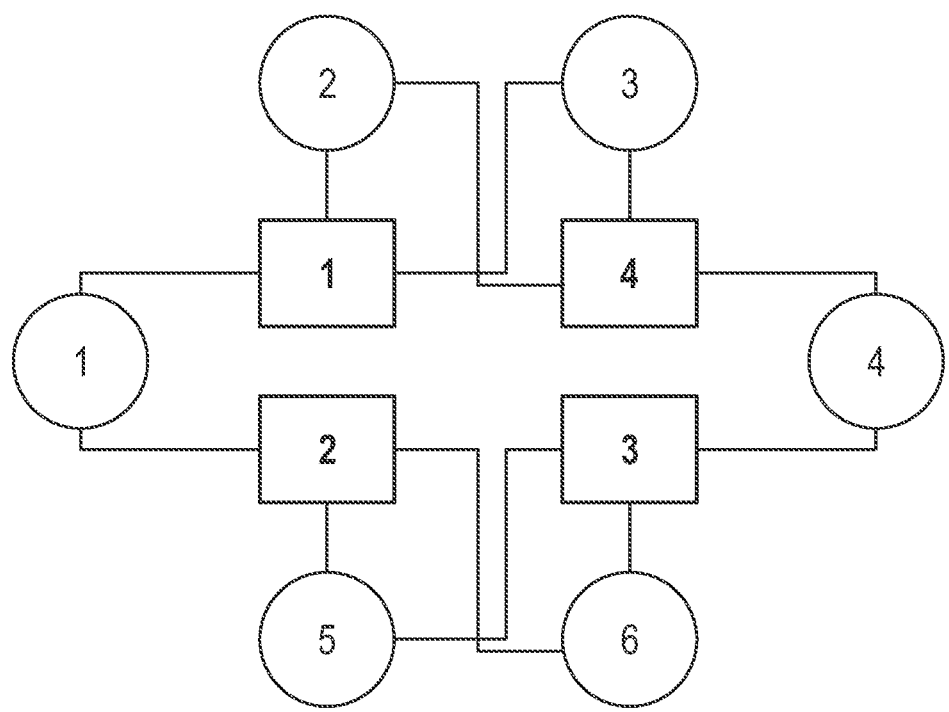
FIG. 13 is a layout of a flight power system with a star architecture according to some embodiments of the present invention.
Figure 14:
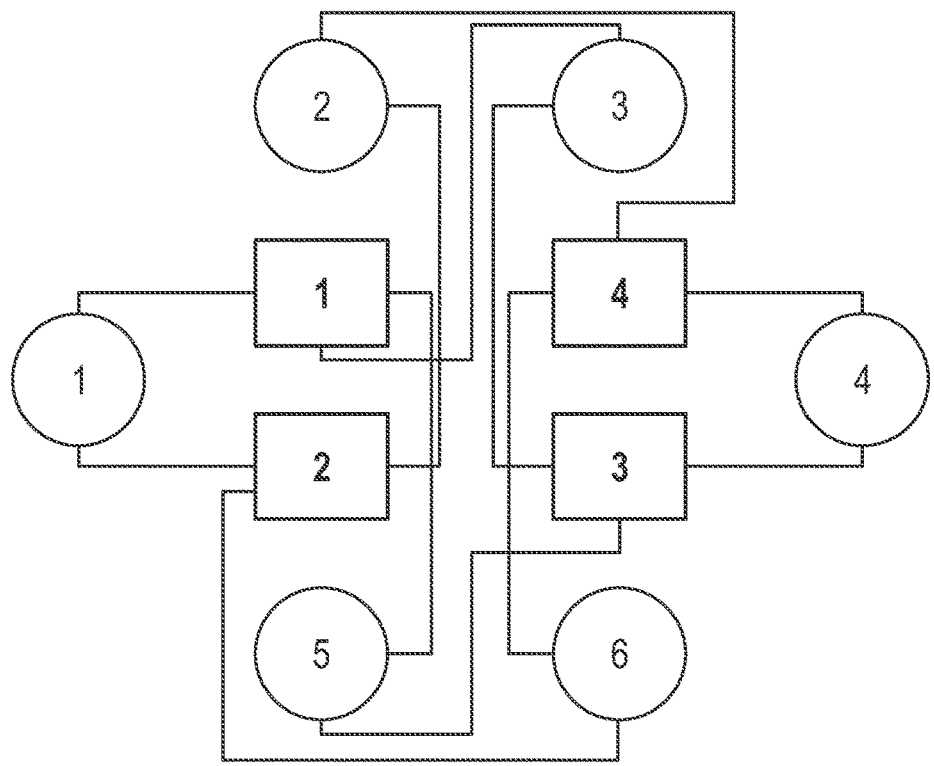
FIG. 14 is a layout of a flight power system with a mesh architecture according to some embodiments of the present invention.

FIGS. 13 and 14 illustrate six motor four battery systems according to some embodiments of the present invention. FIG. 13 illustrates a star architecture using four batteries to power six motors. Each battery is coupled to three motors. FIG. 14 illustrates a mesh architecture with four batteries and six motors.

FIGS. 15A, 15B, and 15C illustrate the maximum loads in the inverters, batteries, and motors, respectively, for inverter-optimized, battery-optimized, and motor-optimized solutions for the various motor-battery architectures described herein during a motor failure. The hexagram architecture is indicated with a symbol, as opposed to a name like the other architectures. As illustrated, the hexagram architecture gives the best solution when reviewed with regard to all optimizations (inverter-optimized, battery-optimized, and motor-optimized).

As evident from the above description, a wide variety of embodiments may be configured from the description given herein and additional advantages and modifications will readily occur to those skilled in the art. The invention in its broader aspects is, therefore, not limited to the specific details and illustrative examples shown and described. The embodiments described herein may include physical structures, as well as methods of use. Accordingly, departures from such details may be made without departing from the spirit or scope of the applicant's general invention.

What is claimed is:

1. An electrically powered vertical take-off and landing aircraft, said aircraft comprising:
    a left inboard propulsion assembly and a left outboard propulsion assembly. each of the left inboard and left outboard propulsion assemblies comprising an electric motor;
    a right inboard propulsion assembly and a right outboard propulsion assembly,. each of the right inboard and right outboard propulsion assemblies comprising an electric motor;
    a plurality of batteries, each of said plurality of batteries coupled to two or more of said electric motors; and
    a flight control system adapted to:
    operate the propulsion assemblies in a vertical thrust generating mode;
    detect failure of a particular propulsion assembly;
    reduce power to a corresponding propulsion assembly, the corresponding propulsion assembly being symmetrically located on an opposite side of a longitudinal centerline of said aircraft relative to the particular propulsion assembly; and
    increase the power delivered to some or all of the remaining propulsion assemblies in order to maintain necessary thrust.

2. The aircraft of claim 1 further comprising a plurality of inverters, wherein each of said batteries is coupled to each of said electric motors through an inverter.

3. The aircraft of claim 1 wherein the left inboard propulsion assembly is offset from the left outboard propulsion assembly along the direction of the longitudinal centerline of said aircraft and the right inboard propulsion assembly is offset from the right outboard propulsion assembly along the direction of the longitudinal centerline of said aircraft.

4. The aircraft of claim 2 wherein the flight control system is adapted to autonomously adjust the power delivered by said batteries to said electric motors in the event of a motor failure to maintain a desired aircraft attitude.

5. The aircraft of claim 1 wherein the flight control system is adapted to autonomously adjust the power delivered by said batteries to said electric motors in the event of a battery failure to maintain a desired aircraft attitude.

6. The aircraft of claim 2 wherein the flight control system is adapted to autonomously adjust the power delivered by said batteries to said electric motors in the event of a battery failure to maintain a desired aircraft attitude.

7. The aircraft of claim 1 wherein each of said electric motors comprises a plurality of motor winding circuits, and wherein each of said winding circuits in said plurality of motor winding circuits in a motor are coupled to a different battery.

8. The aircraft of claim 2 wherein each of said electric motors comprises a plurality of motor winding circuits, and wherein each of said winding circuits in said plurality of motor winding circuits in a motor are coupled to a different battery.

9. The aircraft of claim 4 wherein each of said electric motors comprises a plurality of motor winding circuits, and wherein each of said winding circuits in said plurality of motor winding circuits in a motor are coupled to a different battery.

10. The aircraft of claim 6 wherein each of said electric motors comprises a plurality of motor winding circuits, and wherein each of said winding circuits in said plurality of motor winding circuits in a motor are coupled to a different battery.

11. The aircraft of claim 1 wherein the particular propulsion assembly is coupled to a first battery on a same side of the longitudinal centerline of the aircraft as the particular propulsion assembly and is coupled to a second battery on the opposite side of the longitudinal centerline of the aircraft from the particular propulsion assembly. and the flight control system is adapted to divert power from the first battery and the second battery from the particular propulsion assembly to some or all of the remaining propulsion assemblies.

12. The aircraft of claim 2 wherein the particular propulsion assembly is coupled to a first battery on a same side of the longitudinal centerline of the aircraft as the particular propulsion assembly and is coupled to a second battery on the opposite side of the longitudinal centerline of the aircraft from the particular propulsion assembly and the flight control system is adapted to divert power from the first battery and the second battery from the particular propulsion assembly to some or all of the remaining propulsion assemblies.

13. The aircraft of claim 7 wherein the particular propulsion assembly is coupled to a first battery on a same side of the longitudinal centerline of the aircraft as the particular propulsion assembly and is coupled to a second battery on the opposite side of the longitudinal centerline of the aircraft from the particular propulsion assembly, and the flight control system is adapted to divert power from the first battery and the second battery from the particular propulsion assembly to some or all of the remaining propulsion assemblies.

14. The aircraft of claim 1 wherein the flight control system is adapted to detect failure of a particular propulsion assembly by:
    detecting that the electric motor in the particular propulsion assembly has stopped drawing current.

15. The aircraft of claim 1 wherein the flight control system is adapted to reduce power to the corresponding propulsion assembly by:

reducing power to be within a range of 0-20% of nominal power.

16. An electrically powered vertical take-off and landing aircraft, said aircraft comprising:
- a left inboard propulsion assembly and a left outboard propulsion assembly, the left inboard propulsion assembly being offset from the left outboard propulsion assembly along the direction of a longitudinal centerline of said aircraft, each of the left inboard and left outboard propulsion assemblies comprising an electric motor;
- a right inboard propulsion assembly and a right outboard propulsion assembly, the right inboard propulsion assembly being offset from the right outboard propulsion assembly along the direction of the longitudinal centerline of said aircraft, each of the right inboard and right outboard. propulsion assemblies comprising an electric motor;
- a plurality of batteries, each of said plurality of batteries coupled to two or more of said electric motors; and
- a flight control system adapted to:
- operate the propulsion assemblies in a vertical thrust generating mode;
- detect failure of a particular propulsion assembly of the left and right inboard and outboard propulsion assemblies;
- reduce power to a corresponding propulsion assembly, the corresponding propulsion assembly being symmetrically located on an opposite side of the longitudinal centerline of said aircraft relative to the particular propulsion assembly; and
- increase the power delivered to some or all of the remaining propulsion assemblies in order to maintain necessary thrust.

17. The aircraft of claim 16 further comprising a plurality of inverters, wherein each of said batteries is coupled to each of said electric motors through an inverter.

18. The aircraft of claim 16 further wherein the flight control system is further adapted to autonomously adjust the power delivered by said batteries to said electric motors in the event of a battery failure to maintain a desired aircraft attitude.

19. The aircraft of claim 16 wherein the particular propulsion assembly is coupled to a first battery on a same side of the longitudinal centerline of the aircraft as the particular propulsion assembly and is coupled to a second battery on the opposite side of the longitudinal centerline of the aircraft from the particular propulsion assembly, and the flight control system is adapted to divert power from the first battery and the second battery from the particular propulsion assembly to some or all of the remaining propulsion assemblies.

20. The aircraft of claim 16 wherein the flight control system is adapted to reduce power to the corresponding propulsion assembly by reducing power to he within a range of 0-20% of nominal power.

* * * * *

UNITED STATES PATENT AND TRADEMARK OFFICE
CERTIFICATE OF CORRECTION

PATENT NO. : 11,827,347 B2  
APPLICATION NO. : 16/428794  
DATED : November 28, 2023  
INVENTOR(S) : Bevirt et al.

Page 1 of 1

It is certified that error appears in the above-identified patent and that said Letters Patent is hereby corrected as shown below:

In the Claims

In Column 9, Line 36, in Claim 1, delete "assembly." and insert --assembly,-- therefor In Column 9, Line 40, in Claim 1, delete "assembly,." and insert --assembly,-- therefor In Column 10, Line 36, in Claim 11, delete "assembly." and insert --assembly,-- therefor In Column 11, Line 17, in Claim 16, delete "outboard." and insert --outboard-- therefor In Column 12, Line 26, in Claim 20, delete "he" and insert --be-- therefor Signed and Sealed this  
Eleventh Day of February, 2025

Coke Morgan Stewart  
*Acting Director of the United States Patent and Trademark Office*